(12) United States Patent
Matsumoto et al.

(10) Patent No.: US 8,785,870 B2
(45) Date of Patent: Jul. 22, 2014

(54) IMAGING APPARATUS, RADIATION IMAGING SYSTEM, AND CONTROL METHOD OF IMAGE SENSOR

(75) Inventors: Kazumasa Matsumoto, Yokohama (JP); Kanako Dowaki, Tokyo (JP); Yuichi Naito, Yokohama (JP); Hidehiko Saito, Saitama (JP); Hiroaki Niwa, Kawasaki (JP); Takashi Yamazaki, Kawasaki (JP); Shigeo Kobayashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 202 days.

(21) Appl. No.: 13/279,144

(22) Filed: Oct. 21, 2011

(65) Prior Publication Data

US 2012/0104267 A1 May 3, 2012

(30) Foreign Application Priority Data

Oct. 29, 2010 (JP) ................................. 2010-243808

(51) Int. Cl.
*G01T 1/24* (2006.01)
(52) U.S. Cl.
USPC .................................................. 250/370.09
(58) Field of Classification Search
USPC .................................................. 250/370.09
See application file for complete search history.

(56) References Cited

U.S. PATENT DOCUMENTS

| 6,448,561 | B1 | 9/2002 | Kaifu |
| 6,950,132 | B1 | 9/2005 | Kozuka |
| 2002/0190215 | A1 | 12/2002 | Tashiro |
| 2004/0173864 | A1* | 9/2004 | Inagaki et al. ............... 257/443 |

FOREIGN PATENT DOCUMENTS

| EP | 1259066 A2 | 11/2002 |
| EP | 2437485 A2 | 4/2012 |
| KR | 10-2004-0080337 A | 9/2004 |
| KR | 10-0638698 B1 | 10/2006 |

* cited by examiner

*Primary Examiner* — Constantine Hannaher
(74) *Attorney, Agent, or Firm* — Canon USA, Inc. IP Division

(57) ABSTRACT

An imaging apparatus including: a plurality of pixels including a photoelectric conversion element and a sample hold circuit; a plurality of signal lines configured to read from the plurality of pixels an electric signal held in the sample hold circuit therein; a imaging control unit configured to perform a first control for applying the held electric signal to the plurality of signal lines, and a second control for sequentially applying to the signal lines the electric signal obtained corresponding to light received by each of the plurality of pixels and reading the electric signal, after the first control has been performed; and a generation unit configured not to create image data based on the electric signal applied to the signal line by the first control but to create the image data based on the electric signal read via the signal line by the second control.

24 Claims, 14 Drawing Sheets

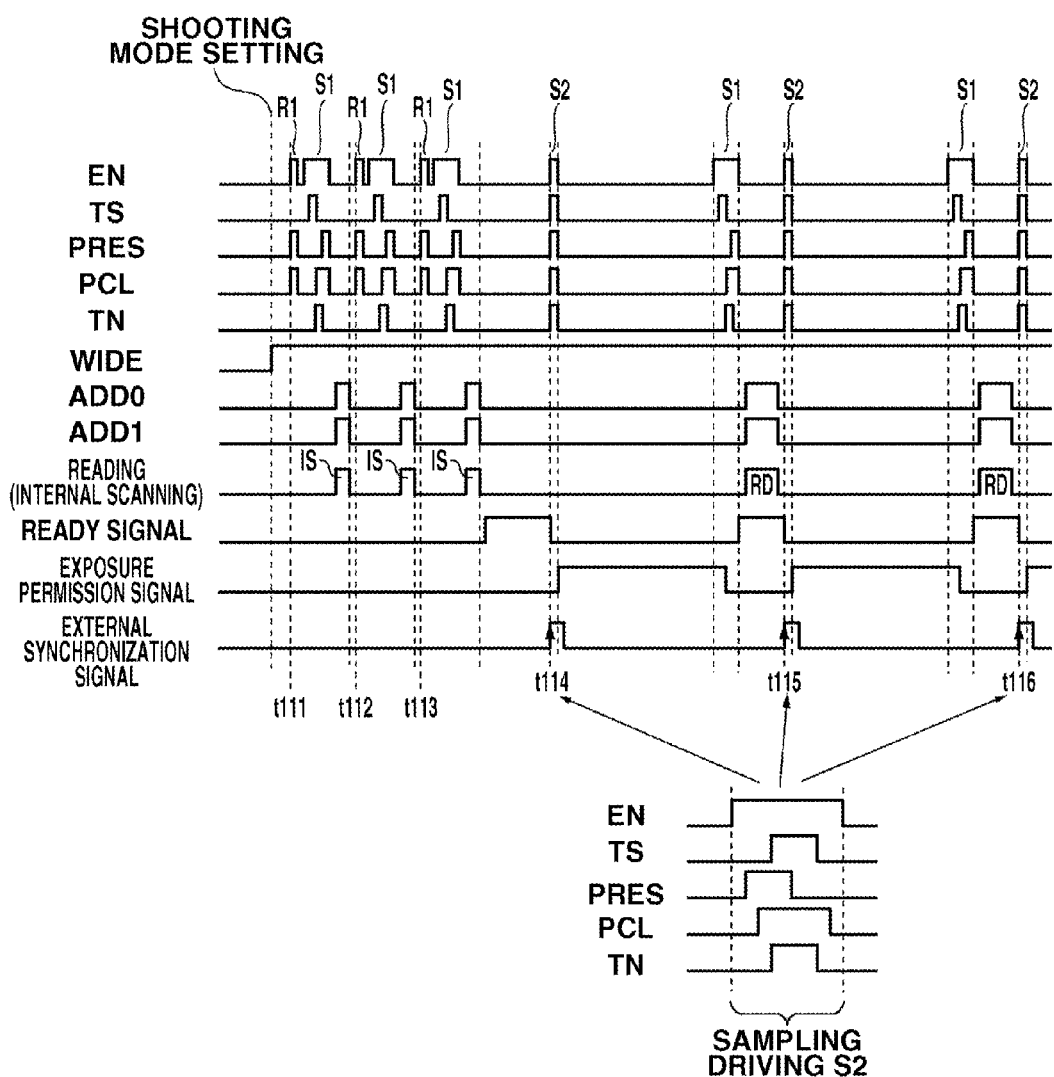

IMAGING APPARATUS, RADIATION IMAGING SYSTEM, AND CONTROL METHOD OF IMAGE SENSOR

BACKGROUND OF THE INVENTION

1. Field of the Invention

The present invention relates to a control method for acquiring signals from photoelectric conversion elements and obtaining an image, an imaging apparatus that performs such control, and a radiation imaging system.

2. Description of the Related Art

In recent years, in a field of a digital X-ray imaging apparatus, in place of an image intensifier, an image sensor having a large area in which photoelectric conversion elements are arranged in a matrix has become popular. Compared to the image intensifier, the image sensor can improve resolution of an image, reduce distortion of an image, and downsize a volume of the imaging apparatus. Image sensors include image sensors of an amorphous silicon type, a charge coupled device (CCD) type, and a complementary metal-oxide semiconductor (CMOS) type.

In the above described image sensor, since noise enters elements included in a circuit, signals need to be extracted corresponding to an amount of received light while the noise is being removed. According to U.S. Pat. No. 6,950,132, a circuit is provided that applies reset potential to a light signal line and a noise signal line disposed between a circuit holding outputs of image pixels and a differential amplifier. By clamping a reset state generated by the reset potential at a subsequent stage of the differential amplifier, the noise of the differential amplifier can be removed.

In a period when the signals are not read from the pixels, a column signal line connected to a scanning line and a row signal line serving as an output line of an image circuit are set to a floating state. Since the signal lines on an element substrate have a certain capacity, the noise is superimposed on the signal lines, which results in an adverse effect on image quality.

Further, since the noise varies within a certain range over time, each of the images includes a different amount of noise superimposed thereon. According to the technique described in U.S. Pat. No. 6,950,132, in which a circuit for applying the reset potential to the signal line and a clamp circuit disposed at a subsequent stage of the signal line are separately required, a circuit structure becomes complicated.

SUMMARY OF THE INVENTION

According to an aspect of the present invention, an imaging apparatus includes a plurality of pixel circuits each having a pixel, a photoelectric conversion element and a sample hold circuit, a plurality of signal lines configured to read from the plurality of pixel circuits an electrical signal held in the sample hold circuit therein, control unit for performing a first control for applying the held electrical signal to the plurality of signal lines and a second control for sequentially applying to the signal lines the electrical signal obtained by each pixel circuit corresponding to light received by each of the plurality of pixels and reading the electrical signal, after the first control has been performed, and generation unit configured to not create image data based on the electrical signal applied to the signal line by the first control and to create image data based on the electrical signal read via the signal line by the second control.

Further features and aspects of the present invention will become apparent from the following detailed description of embodiments with reference to the attached drawings.

BRIEF DESCRIPTION OF THE DRAWINGS

The accompanying drawings, which are incorporated in and constitute a part of the specification, illustrate embodiments, features, and aspects of the invention and, together with the description, serve to explain the principles of the invention.

FIG. 9 is a timing chart illustrating another example of drive control of a sensor when a moving image is captured in which an X-ray window is limited at a fixed frame rate by an external synchronization mode.

DESCRIPTION OF THE EMBODIMENTS

Figure 1:
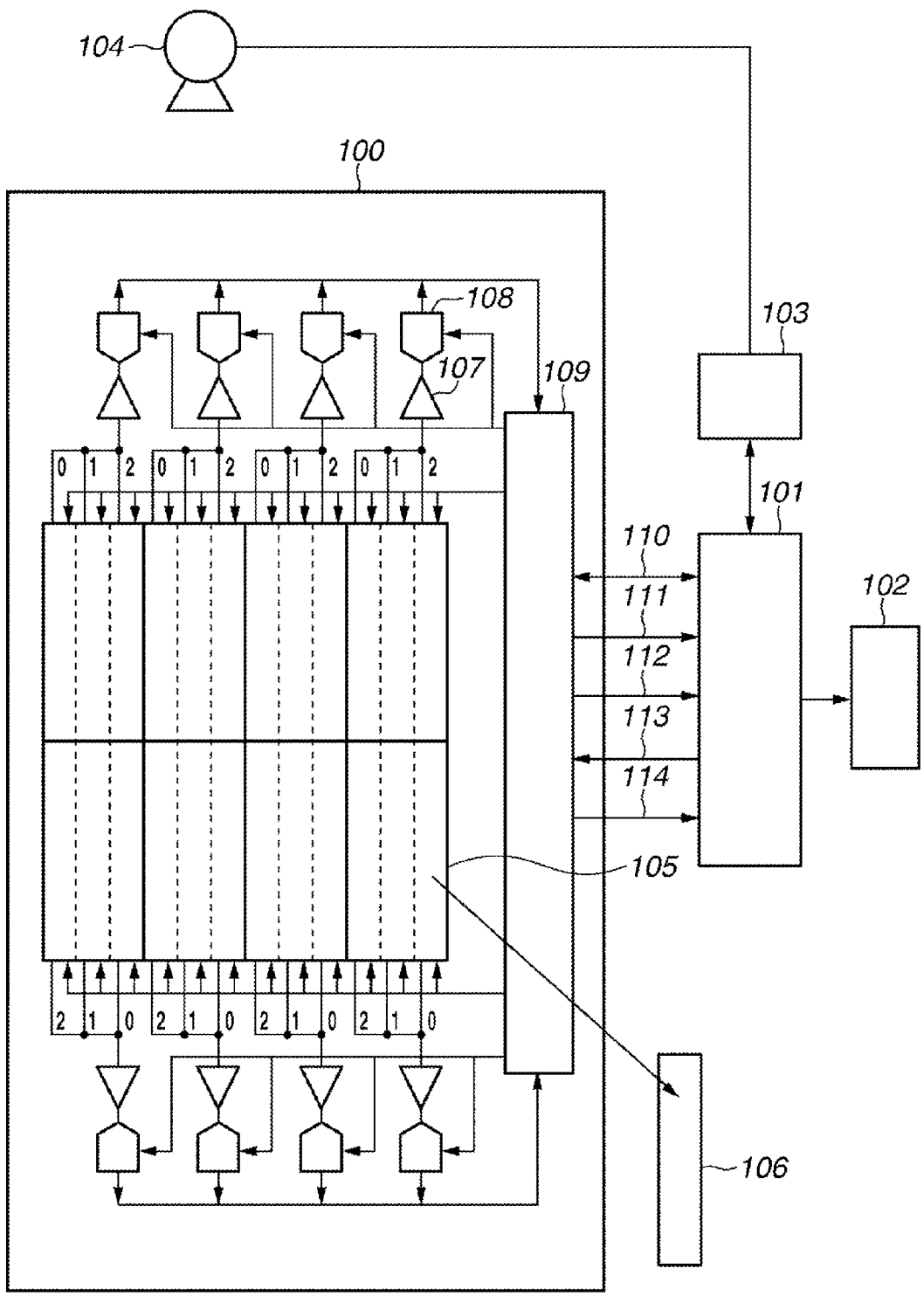
FIG. 1 illustrates a configuration of a radiation imaging system 1.

Various embodiments, features, and aspects of the present technique will be described in detail below with reference to the drawings.

A first embodiment will be described below. A flat panel sensor 105 digital-converts three tiled rectangular semiconductor substrates as one conversion region of an A/D converter 108. A conversion clock of the A/D converter 108 for reading the rectangular semiconductor substrates is defined as 20 MHz. The A/D converter 108 performs A/D conversion on one line of the rectangular semiconductor substrates within the one A/D conversion region formed of three rectangular semiconductor substrates in a lateral direction while switching chip selection. The A/D converter 108 repeatedly performs the conversion sequentially from an outside portion to a center portion in a longitudinal direction.

A configuration of a radiation imaging system according to the first embodiment will be described based on FIG. 1. The radiation imaging system 10 includes a radioactive imaging device 100, an information processing device 101 that performs image processing and system control, an image display device 102, an X-ray generation device 103, and an X-ray tube 104.

The information processing device 101 synchronizes and controls the radioactive imaging device 100 and the X-ray generation device 103 in imaging an object. The radioactive imaging device 100 converts radiation that has gone through the object into visible light by a scintillator (not illustrated), and then image data created by photoelectrical conversion is transferred from the radioactive imaging device 100 to the information processing device 101. After the information processing device 101 performs image processing on the image data, the image display device 102 displays a radiation image of the object. Since irradiating the object with the radiation, generating the image, and displaying the image are repeatedly performed in real time, radioactive moving images of the object can be observed while the object image is being captured.

The flat panel sensor 105 in the radioactive imaging device 100 is a two-dimensional image sensor. A rectangular semiconductor substrate 106 is an image sensor of a CMOS type obtained by cutting out a two-dimensional photoelectric conversion element having a rectangular-strip shape from a silicon semiconductor wafer. The flat panel sensor 105 is obtained by tiling the rectangular semiconductor substrates 106 in the matrix of 12 columns×2 rows on a flat-face base plate (not illustrated).

On the rectangular semiconductor substrate 106 cut out in a rectangular-strip shape having about 20 mm of width and about 140 mm of length, 128 pixels and 896 pixels are arranged in a lateral direction and a longitudinal direction respectively with a pitch of 160 μm. The rectangular semiconductor substrate 106 is developed as an area sensor for bonding, and the photoelectric conversion pixels generated on the rectangular semiconductor substrate 106 are two-dimensionally aligned at an even pitch. On the adjacent rectangular semiconductor substrates on the flat-face base plate, the photoelectric conversion elements are tiled across a boundary between the rectangular semiconductor substrates with the same pitch as that on the photoelectric conversion elements on the rectangular semiconductor substrate.

With this arrangement, the pixels are arranged in the matrix over the flat panel sensor 105. At an upper side portion and a lower side portion of the flat panel sensor 105, external terminals (electrode pads) (not illustrated) of the rectangular semiconductor substrates arranged in the matrix are aligned in one line. The electrode pad of the rectangular semiconductor substrate is connected with an external circuit by a printing wiring plate of a flying lead type (not illustrated).

On the rectangular semiconductor substrate, switching elements including an analog switch element for switching "Enable/Disable" of analog output are provided. By providing the switching elements for the analog output, output of the rectangular semiconductor substrate can be controlled by a chip selection control signal, and thus analog output lines on the rectangular semiconductor substrate can be collectively connected to an amplifier directly.

An imaging control unit 109 transmits/receives a control command and a synchronization signal to/from the information processing device 101 and transmits image data to the information processing device 101. Further, the imaging control unit 109 also has a function for controlling the flat panel sensor 105, which is an image sensor, to drive and control the flat panel sensor and control an imaging mode.

Furthermore, the imaging control unit 109 synthesizes frame data and digital image data for each block that has been A/D converted by a plurality of A/D converting devices included in the radioactive imaging device 100 to create the radiation image. Thus, the imaging control unit 109 also functions as an image generation unit and performs the aforementioned processing using the image creation circuit (not illustrated). The imaging control unit 109 transfers the radiation image to the information processing device 101.

Based on the control by the information processing device 101 and the imaging control unit 109, the information processing device 101 transmits/receives information to/from the imaging control unit 109 via an interface 110. The information processing device 101 transmits settings of the imaging mode to the imaging control unit 109, various parameters, start and finish of imaging. The imaging control unit 109 transmits to the information processing device 101 a state of a radioactive imaging device.

Main data will be described below. The captured image data is transmitted from the imaging control unit 109 to the information processing device 101. A READY signal 112 is used by the imaging control unit 109 to notify the information processing device 101 that the radioactive imaging device 100 is ready for imaging. When the information processing device 101 receives the READY signal 112 from the imaging control unit 109, an external synchronization signal 113 notifies the imaging control unit 109 of timing for exposing to the X-ray. An exposure permission signal 114 notifies that the radioactive imaging device 100 has finished preparing for imaging.

The exposure permission signal 114 is transmitted from the information processing device 101 to the X-ray generation device 103 while it is in a state of "Enable", the X-ray radiated from the X-ray tube 104 is stored as the valid X ray to create an X-ray image.

Figure 2:
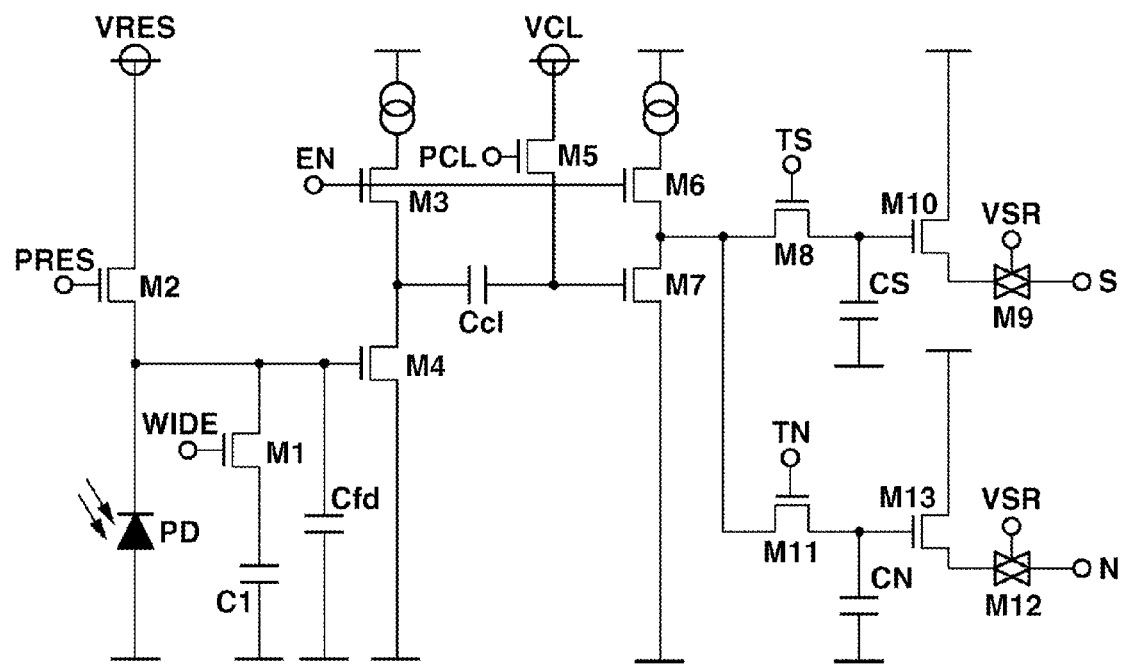
FIG. 2 illustrates a pixel circuit that is two-dimensionally formed on a rectangular semiconductor substrate.

A configuration of the pixel circuit of the flat panel sensor 105 in the aforementioned radioactive imaging device 100 will be described based on FIG. 2. In FIG. 2, photo diode (PD) converts light into electricity. A reset switch M2 is a reset metal-oxide semiconductor (MOS) transistor (reset circuit) for discharging charge stored in floating diffusion capacitor Cfd.

The floating diffusion capacitor Cfd is a capacitor of floating diffusion (floating diffusion region) for storing the charge. The photoelectric conversion element storing the charge is formed by the PD, a parasite capacity of the PD and the floating diffusion capacitor Cfd. A sensitivity switch M1 is a sensitivity switching MOS transistor for switching between a high dynamic range mode and a high sensitivity mode.

A capacitor C1 is used to expand the dynamic range. When turning on the sensitivity switch M1, the charge can be stored. When turning on the sensitivity switch M1, the capacitance of the floating node portion is substantially increased and the dynamic range can be expanded, although the sensitivity becomes low. Thus, for example, when fluoroscopic imaging that needs high sensitivity is performed, the sensitivity switch M1 is turned off. When digital substraction angiography (DSA) imaging that needs a high dynamic range is performed, the sensitivity switch M1 is turned on.

A pixel amplifier M4 is an amplification MOS transistor operating as a source follower. A selection switch M3 is a selection MOS transistor switching the pixel amplifier M4 to an operation state. The pixel amplifier M4 generates signal voltage corresponding to signal charge stored in the floating diffusion capacitor Cfd.

A subsequent stage of the pixel amplifier M4 includes a clamp circuit for removing the kTC noise generated in the photoelectric conversion unit. The clamp circuit includes a clamp capacitor Ccl and a clamp switch M5. A power source applies reference voltage or clamp voltage to the clamp circuit. A pixel amplifier M7 is an amplification MOS transistor operating as a source follower. A selection switch M6 is a selection MOS transistor for switching the pixel amplifier M7 to an operation state. The clamp circuit is disposed between the pixel amplifier M4 and a sample hold circuit.

A subsequent stage of the pixel amplifier M7 includes two sample hold circuits. These two sample hold circuits sample and hold light signal voltage and noise signal voltage according to the charge corresponding to the amount of the received light.

A first sample hold circuit includes a signal switch M8, a signal capacitor CS, and a signal amplifier M10. A second sample hold circuit includes a noise switch M11, noise capacitor CN, and a noise amplifier M13. The sample hold circuits described above are indirectly connected to the pixel amplifier M4, and then function as holding units holding input voltage.

The signal switch M8 is a sample hold MOS transistor included in the sample hold circuit storing the light signal. The signal capacitor CS is a capacitor holding the light signals. A noise switch M11 is a sample hold MOS transistor included in the sample hold circuit storing the noise signals. The noise capacitor CN is a capacitor holding the noise signals.

A sensitivity switch M10 is an amplification MOS transistor of the light signal operating as a source follower. A signal reading switch M9 is an analog switch for reading the light signal amplified by the sensitivity switch M10 via the light signal lines. A sensitivity switch M13 is an amplification MOS transistor for the noise signal, operating as a source follower.

A noise reading switch M12 is an analog switch for reading the noise signal amplified by the noise amplifier M13 via the noise signal line. The voltage to be input to the sample hold circuit includes the clamp voltage and the signal voltage. Each voltage sampled by the signal reading switch M9 and the noise reading switch M12 is applied to the signal line.

The signal reading switch M9 and the noise reading switch M12 perform control to determine whether to apply the sampled and held voltage to a column signal line. With this control, the sampled voltage is input to the amplifier 107 and the A/D converter 108 that are disposed outside the flat panel sensor 105.

An EN signal is a control signal connected to a gate of the selection switch M3 and selection switch M6 to switch the pixel amplifier M4 and the pixel amplifier M7 into the operation state. When the EN signal is set to a high level, the pixel amplifier M4 and the pixel amplifier M7 are switched to the operation state at the same time. A WIDE signal is connected to a gate of the sensitivity switch M1 to control switching of the sensitivity. When the WIDE signal is set to a low level, the sensitivity switching switch is turned off to set a high sensitivity mode.

A PRES signal is a reset signal for turning on the reset switch M2 to discharge the charge stored in the PD. A PCL signal controls the clamp switch M5. When the PCL signal is set to the high level, the clamp switch M5 is turned on to set the clamp capacitor Ccl to reference voltage VCL. A TS signal is a light signal sample hold control signal. By setting the TS signal to the high level and turning on the signal switch M8, the light signals are collectively transferred to the signal capacitor CS via the pixel amplifier M7.

Subsequently, by setting the TS signals to the low level collectively for all images and turning off the signal switch M8, the sample hold circuit completes holding the light signal charge. A TN signal is a noise signal sample hold control signal. By setting the TN signal to the high level and turning on the noise switch M11, the noise signals are collectively transferred to the noise capacitor via the pixel amplifier M7.

By setting the TN signal to the low level collectively for all images and turning off the noise switch M11, the sample hold circuit completes holding the noise signal charge. After the signal capacitor CS and the noise capacitor CN have finished sampling and holding of the light signals, the signal switch M8 and the noise switch M11 are turned off, and then the signal capacitor CS and the noise capacitor CN are separated from a storage circuit of a previous portion. With this arrangement, the stored light signals can be read without destruction until the light signals are sampled and held again.

Figure 3:
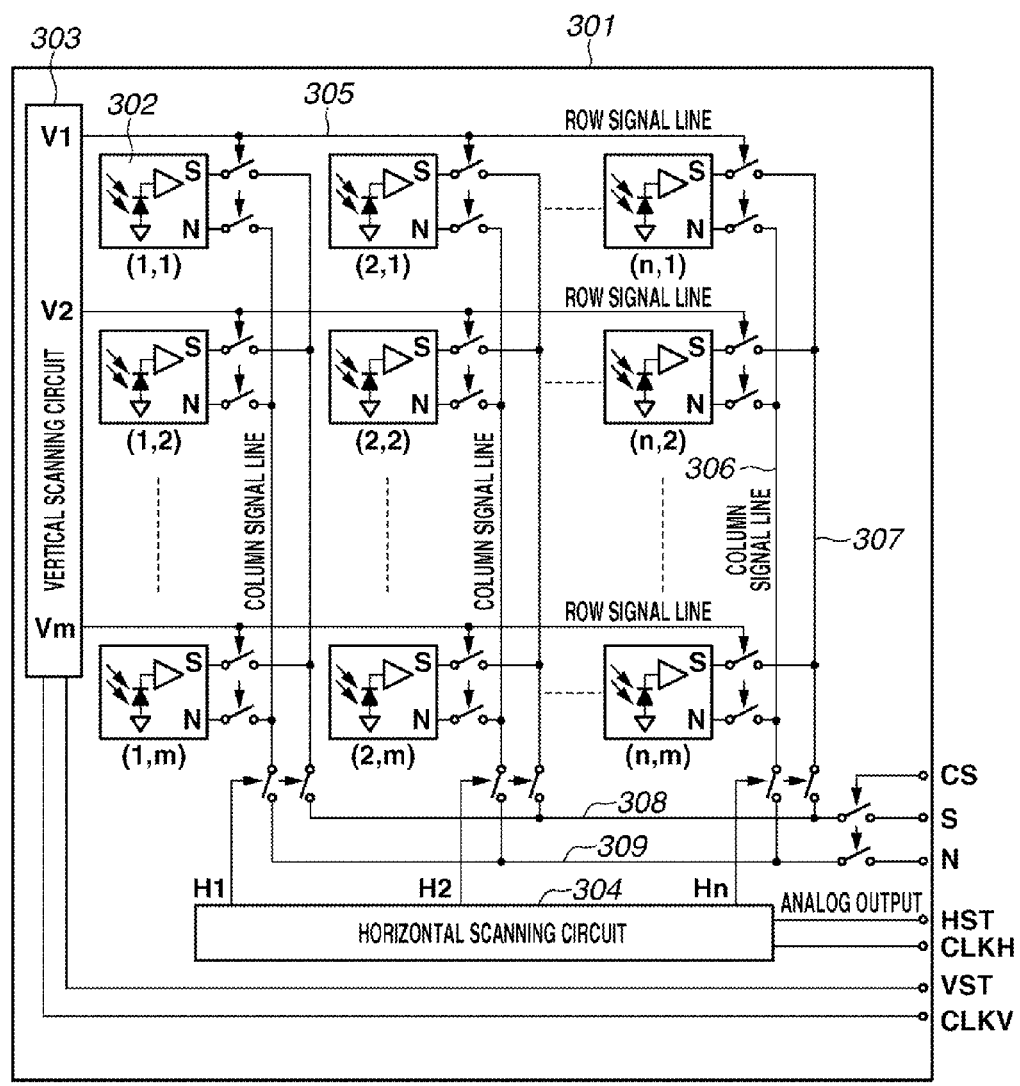
FIG. 3 schematically illustrates an internal configuration of a rectangular semiconductor substrate.

FIG. 3 schematically illustrates an example of an internal configuration of a CMOS rectangular semiconductor substrate.

A rectangular semiconductor substrate 301 includes a chip select terminal CS, a light signal output terminal "S", a noise signal output terminal "N", a vertical scanning circuit start signal (VST) terminal, a vertical scanning circuit clock (CLKV) terminal, a horizontal scanning circuit start signal (HST) terminal, and a horizontal scanning circuit clock (CLKH) terminal.

A vertical scanning circuit 303 selects a group of pixels in a lateral direction, synchronizes with the vertical scanning circuit clock CLKV, and then sequentially scans the group of pixels in the vertical direction, which is a sub scanning direction. A horizontal scanning circuit 304 synchronizes the column signal line of the group of the pixels in the lateral direction, which is a first scanning direction, selected by the vertical scanning circuit with the horizontal scanning clock (CLKH) terminal to sequentially select a pixel one by one.

A pixel circuit 302 is a pixel circuit illustrated in FIG. 1. When a row selecting line 305, which is an output line of the vertical scanning circuit 303, becomes "Enable", the pixel circuit 302 outputs to the column signal lines 306 and 307 a light signal voltage signal "S" and a noise voltage signal "N" that have been sampled and held.

The row selecting line 305, also referred to as row signal line 305, is a signal transmission path for transmitting the signal for selecting the pixel for each row, and a plurality of row signal lines 305 are disposed in parallel with the row.

Column signal lines 306 and 307 are the signal transmission paths for reading the signals of the selected pixels for each column, and a plurality of column signal lines 306 and 307 are disposed in parallel with the column. By the horizontal scanning circuit 304 sequentially selecting the voltage signals output to the column signal lines 306 and 307, the voltage signal of each pixel is sequentially output to analog output signal lines 308 and 309. The analog output signal lines 308 and 309 output the signals of the column signal lines 306 and 307 to the A/D converter.

As described above, the rectangular semiconductor substrate selects the pixels by switching operations using an XY address method using the vertical scanning circuit 303 and the horizontal scanning circuit 304. The voltage signals of the light signal "S" and the noise signal "N" of each pixel amplified by the transistor are output to analog output terminals "S", "N" respectively via the column signal lines 306 and 307 and the analog output signal lines 308 and 309.

By turning on a chip selecting signal input terminal CS, the light voltage signal "S" and the noise voltage signal "N" of the image sensor according to the internal scanning are output from the analog output terminals "S" and "N" respectively. The transmission circuit for reading and scanning includes an "S" signal output switching analog switch (transfer switch "S"), an "N" signal output switching analog switch (transfer switch "N"), the column signal lines 306 and 307, and a switching transistor for switching the column signal lines.

The vertical scanning circuit clock (CLKV) terminal and the vertical scanning circuit start signal (VST) terminal are provided. After setting the vertical scanning start signal VST to high, the vertical scanning clock CLKV is input so that the row selecting signals of V1, V2 . . . Vm are sequentially switched to "Enable".

When the vertical scanning is started, the vertical scanning start signal VST is set to low. The horizontal scanning circuit clock (CLKH) terminal and the horizontal scanning circuit start signal (HST) terminal are provided. By setting the horizontal scanning start signal VST to high and inputting the horizontal scanning clock CLKH, the column selecting signals of H1, H2 . . . Hm are sequentially switched to "Enable". When the horizontal scanning is started, the horizontal scanning start signal HST is set to low.

When the row selecting signal V1 output of the vertical scanning circuit 303 becomes "Enable", the group of the pixels from (1, 1) to (n, 1) in one lateral line connected to the row selecting signal V1 is selected, and then each pixel in the one lateral line outputs the voltage signals "N" and "S" to the column signal lines 306 and 307 respectively.

By switching to "Enable" the column selecting signals sequentially H1, H2, . . . Hn of the horizontal scanning circuit 304, the signal output switch and/or the noise output switch included in each column signal line is sequentially turned on. With this arrangement, the voltage signals "S" and "N" of the pixels in the one lateral line are output to the analog output terminals "S" and "N" via the analog output signal lines 308 and 309 respectively. By performing the similar horizontal scanning up to the row selecting signal Vm, the pixel output of all pixels can be obtained.

Figure 4:
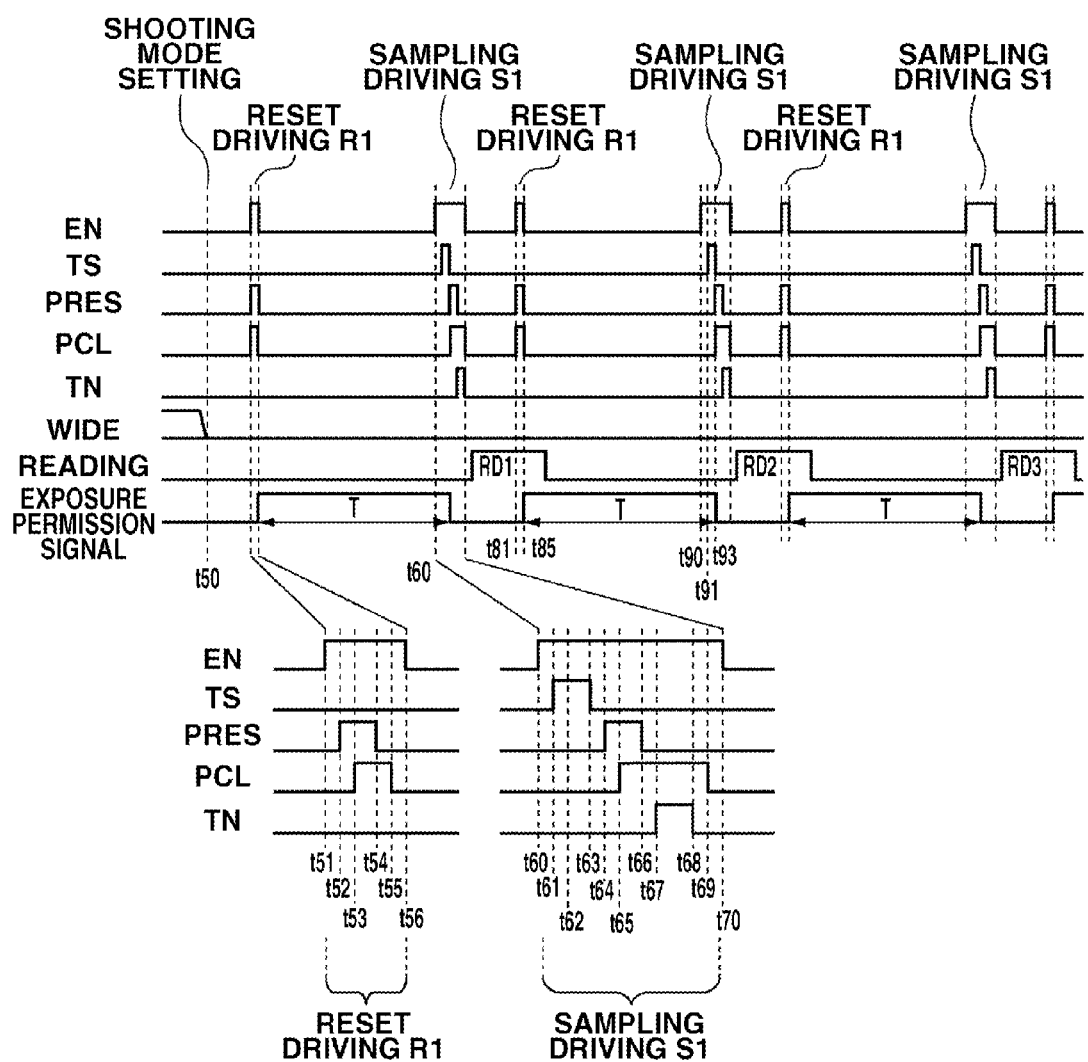
FIG. 4 is a timing chart illustrating drive control when a moving image is captured in which an X-ray window is limited at a fixed frame rate.

FIG. 4 is a timing chart illustrating an example of drive control when a moving image is captured in which an X-ray window is limited at a fixed frame rate in the pixel circuit illustrated in FIG. 2. Herebelow, in capturing the moving image, the timing of the control signals until the charge is sampled and held in the signal capacitor CS and the noise capacitor CN will be described with reference to FIG. 2.

In the timing chart illustrated in FIG. 4, the imaging mode is set at t50 and drive for imaging is started at t51.

Reset drive R1 starting at t51 will be described. The reset drive R1 performs drive to reset and clamp. First, at t51, the signal EN is set to the high level, and the pixel amplifier M4 and the pixel amplifier M7 are set to the operation state. Next, at t52, the signal PRES is set to the high level, and the PD is connected to the reference voltage VRES. Next, at t53, the PCL signal is set to the high level to turn on the clamp switch M5, and then the reference voltage VCL is connected to a pixel amplifier M7 side of the clamp capacitor Ccl.

At t54, the signal PRES is set to the low level to finish reset, and then reset voltage is set at a pixel amplifier M4 side of the clamp capacitor Ccl. At t55, the clamp switch M5 is turned off, and the charge corresponding to the voltage of difference between the reference voltage VCL and the reference voltage VRES is stored in the clamp capacitor Ccl, and then the clamp is finished.

The reset drive R1 is finished, and at t55, the charge is started to be stored in the photoelectric conversion units of the PD and the floating diffusion capacitor Cfd. At t56, the EN signal is set to the low level to set the pixel amplifier M4 and the pixel amplifier M7 to a non-operation state. Since the photoelectric conversion unit becomes a storage state, an exposure permission signal is set to "Enable" to request exposure to the X-ray. The subsequent reset drive is also controlled with this timing.

In order to prevent image displacement caused by time gaps of switching between the image sensors and between scanning lines during imaging the moving image, all tiled pixels of each image sensor are collectively reset-driven with the same timing in the same period.

Photoelectric charge generated in the PD of each pixel circuit is subsequently stored by collective exposure in the capacitor Cfd. When the reference voltage VRES is applied to the PD during the reset drive from t52 to t54, reset noise (kTC noise) is generated in the photoelectric conversion unit. To address this problem, the reference voltage VCL is applied to a pixel amplifier M7 side of the clamp capacitor Ccl in the clamp circuit to remove the reset noise.

Sampling drive S1 starting at t60 will be described. By setting the EN signal to the high level and turning on the selection switches M3, M6, the charge stored in the capacitor Cfd is converted into the charge/voltage and output as the voltage to the clamp capacitor Ccl by the pixel amplifier M4 operating as a source follower. The output of the pixel amplifier M4 includes the reset noise, however, since the reference voltage VCL is set at the pixel amplifier M7 side by the clamp circuit when resetting, the light signal with the reset noise removed is output to the pixel amplifier M7.

At t61, by setting the sample hold control signal TS to the high level and turning on the signal switch M8, the light signal is collectively transferred to the light signal hold capacitor CS via the pixel amplifier M7. Since sampling and holding are started, at t62, the exposure permission signal is set to "Disable" to prohibit the X-ray exposure. At t63, by setting the TS signal to the low level and turning off the signal switch M8, the photoelectric charge signal is sampled and held in the light signal hold capacitor CS.

Next, at t64, by setting the reset signal PRES to the high level and turning on the reset switch M2, the capacitor Cfd is reset to the reference voltage VRES. At t65, the PCL signal is set to the high level. The clamp capacitor Ccl stores the charge including the reset noise superimposed on the voltage of the difference between the voltage VCL and the voltage VRES. At t66, the set signal PRES is set to the low level to finish the reset. At t67, by setting the TN signal to the high level and turning on the noise switch M11, the noise signal set to the reference voltage VCL is transferred to the noise signal hold capacitor CN.

At t68, by setting the TN signal to the low level and turning off the noise switch M11, the noise signal is sampled and held in the noise signal hold capacitor CN. At t69, the PCL signal is set to the low level and, at t70, the EN signal is set to the low level to finish the sampling drive S1. The sampling drive S1 is collectively performed on all the pixels. The sampling drive that is subsequently performed is controlled in the timing described above. After the sampling drive S1 is performed, at t91, the reset drive R1 is performed again, and the subsequent frames are started to be stored in the PD.

Scanning of the light signal and the noise signal is performed for each pixel. By turning on the signal reading switch M9 and the noise reading switch M12, the voltage of the light signal hold capacitor CS and the voltage of the noise signal hold capacitor CN are transferred to a light signal output line and a noise signal output line respectively via the sensitivity switch M10 and the sensitivity switch M13. The signals transferred to the noise signal output line and the light signal output line are subtracted by an operation input amplifier (not illustrated) connected to the noise signal output line and the light signal output line respectively.

With this arrangement, fitted pattern noise (FPN) caused by thermal noise, 1/f noise, difference of temperatures, and process variations in the pixel amplifier are removed. A period when the sensor can read the signals is from a time when sampling and holding are finished at t68 to a time when sampling and holding the photoelectric charge signal of the next frame in the light signal hold capacitor CS and the noise signal hold capacitor CN at t91 is started again. After the sampling drive S1 is finished, the reading processing RD1 of the pixels is performed. The reading processing RD1 is performed right after sampling and holding is performed to reduce delay of displaying of the image as much as possible.

In the pixel circuit illustrated in FIG. 2, timing for starting to store the charge in the PD is at time points of t55 and t69 when the PCL signal is set to the low level and the clamp is completed after the reset has been finished as illustrated in FIG. 4. Further, the timing for finishing the storage is a time point of t63 when the TS signal is set to the low level and the light signal is sampled and held.

With this arrangement, between the sampling drive S1 that samples and holds the light signal and the noise signal and the sampling drive S1, by inserting the reset drive R1 for starting a storage time or the sampling drive S1, a storage time is limited. In FIG. 4, by inserting the reset drive R1 starting at t81 between the sampling drive S1 starting at t60 and the sampling drive S1 starting at t90, the X-ray window, which is a substantial storage time, is limited to period "T" from t85 to t93.

Figure 5:
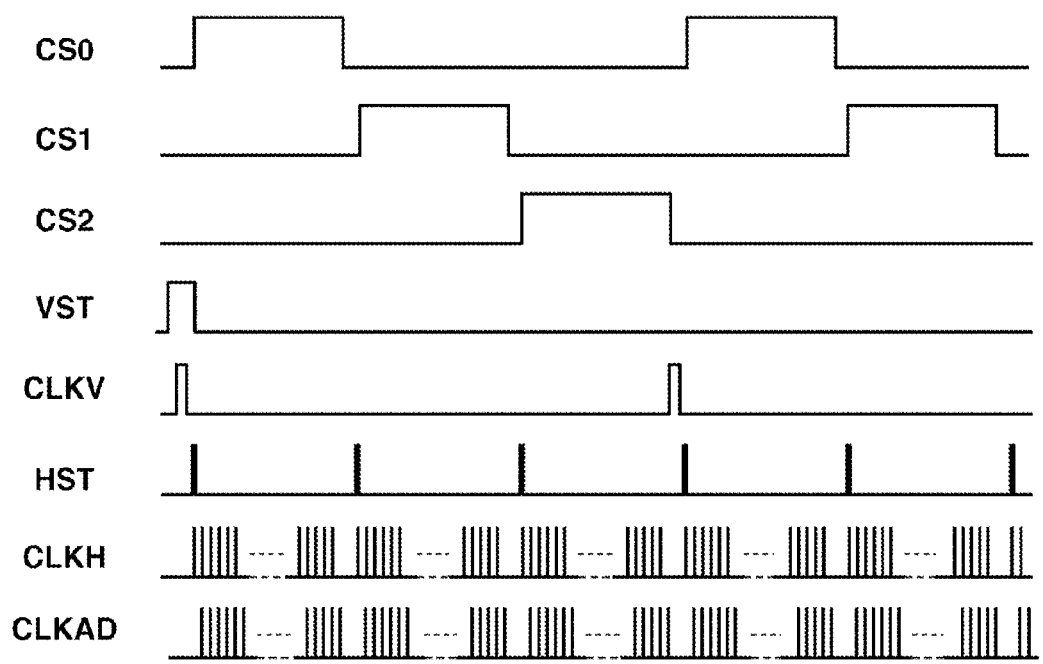
FIG. 5 is a time chart for reading image data of three tiled rectangular semiconductor substrates using one analog/digital (A/D) converter.

FIG. 5 is a time chart for reading the pixel data of three tiled rectangular semiconductor substrates by one A/D converter.

Chip selecting signals CS0 to CS2 control the output of analog signals of the rectangular semiconductor substrate. Numeral figures assigned to the analog output signals of the rectangular semiconductor substrate illustrated in FIG. 4 each correspond to numeral figures of the chip selecting signals CS of the time chart one by one. For example, during an "H" level of the chip selection signal CS0, the analog output of an analog output signal number "0" is valid and thus output to the amplifier 107 at the subsequent stage.

During an "H" level of the chip selection signal CS1, the analog output of an analog output signal number "1" is valid and thus output to the amplifier 107 at the subsequent stage. The chip selection signal CS0 is connected to the rectangular semiconductor substrate having the analog output signal number "0". The chip selection signal CS1 is connected to the rectangular semiconductor substrate having the analog output signal number "1". The chip selection signal CS2 is connected to the rectangular semiconductor substrate having the analog output signal number "2".

In order to read the image, at first, a chip selection signal CS0 is selected.

When the vertical scanning start signal VST is in a high state, if the vertical scanning clock CLKV rises, the row signal line V1 of the vertical scanning circuit illustrated in FIG. 3 becomes "Enable". The output of the group of the images from (1, 1) to (n, 1) selected by the row signal V1 becomes valid, and then a pixel voltage signal for each pixel of the group of the images from (1, 1) to (n, 1) is output to each column signal line.

When the horizontal scanning start signal HST is in the high state, if the horizontal scanning clock CLKH rises, the column selecting signal H1 of the horizontal scanning circuit becomes "Enable". In synchronization with rising of the CLKH, the column selecting signal H2 of the horizontal scanning circuit is switched to H2, . . . Hn, the pixel is sequentially selected from (1, 1) to (n, 1), and then scanning of the group of the pixels in the lateral direction disposed on the rectangular semiconductor substrate that are selected by the chip selection signal CS0 in the horizontal direction is finished.

The A/D conversion is performed in synchronization with the CLKH. Next, the chip selection signal CS0 is switched to a chip selection signal CS1 so that the horizontal scanning is similarly performed. Regarding the chip selection signal CS2, the horizontal scanning is similarly performed to finish reading the group of the images aligned in the one lateral line on the three rectangular semiconductor substrates.

Hereinafter, by sequentially switching the row signal lines of the vertical scanning circuit with the CLKV and similarly performing the horizontal scanning up to the row selecting signal Vm, reading of all pixels of the three rectangular semiconductor substrates are completed.

A flyback time controlled by the CLKV signal for switching the lines of the pixels to be A/D converted is defined as 1 μ sec, and switching times of the chip selection signals CS0, CS1, CS2 are defined as 1 μ sec. The chip selection is switched at the same time as the flyback time.

Under the conditions described above, a time for reading one line is 22.2 μ sec, and a time for A/D converting 384 pixels in the lateral direction and 896 pixels in the longitudinal direction in a region of the three rectangular semiconductor substrates by one A/D converter is about 20 msec. By simultaneously performing the A/D conversion by all A/D converters of a sensor panel, reading the images of the sensor panel is completed in about 20 msec.

Figure 6:
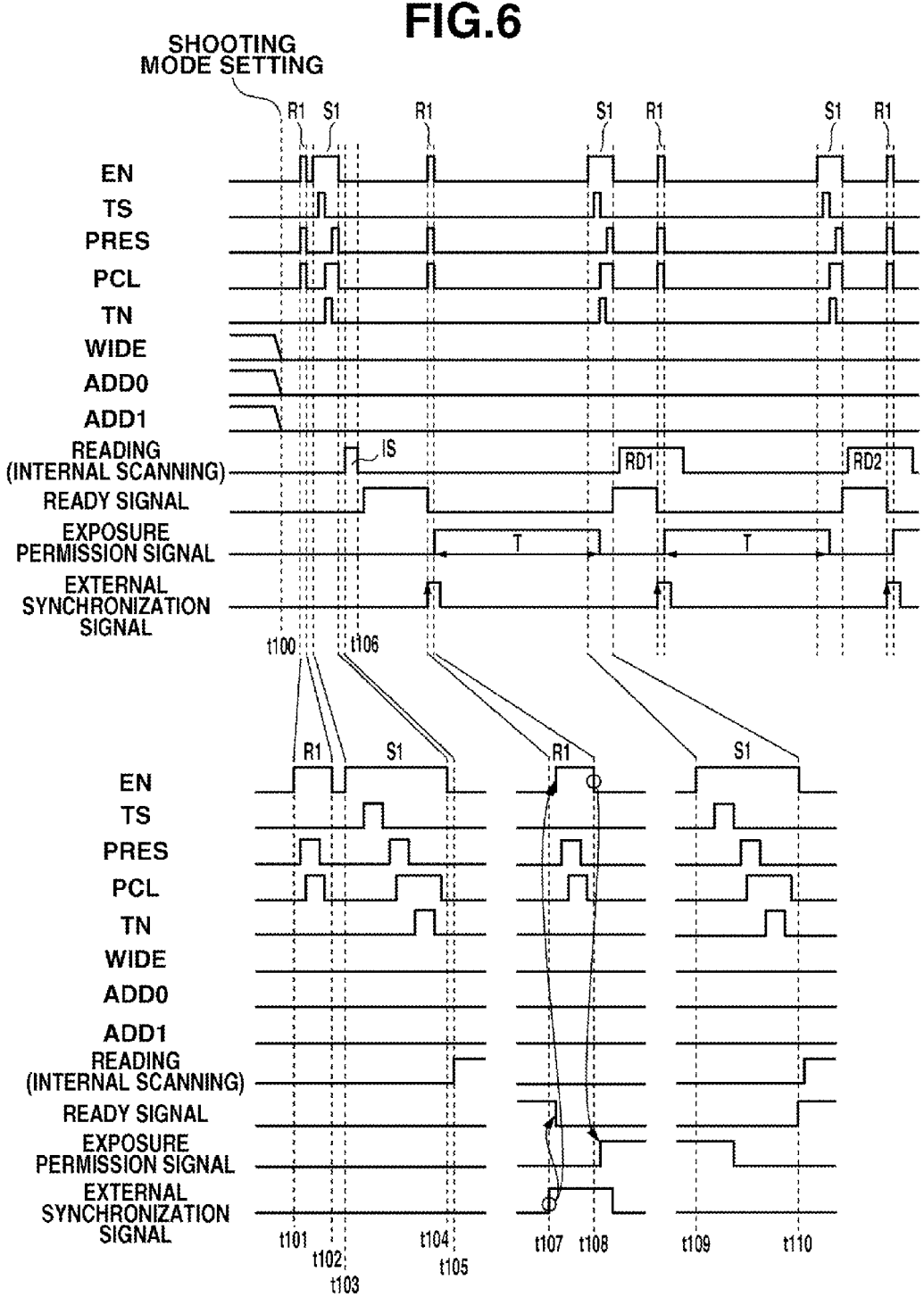
FIG. 6 is a timing chart illustrating drive control of a sensor when a moving image is captured in which an X-ray window is limited at a fixed frame rate by an external synchronization mode.

FIG. 6 is a timing chart illustrating drive control of the sensor when the moving image is captured in which the X-ray window is limited at the fixed frame rate in an external synchronization mode according to the first embodiment of the present technique. FIG. 6 illustrates an example of a high sensitivity mode as an imaging mode, in which the pixels are not added. FIG. 6 illustrates reset drives R1 and sampling drives S1.

As described for the timing chart of the drive control illustrated in FIG. 4, by inserting the reset drive R1 between the sampling drives S1, S1, the X-ray window that is a time for storing the valid light signals is represented as the period "T" between the reset drive R1 and the sampling drive S1. The flat panel sensor 105 performs simultaneous rest on all pixels with the reset drive R1 and simultaneous sampling on all pixels with the sampling drive S1.

This control is featured by performing an internal scanning IS (first control) in which the voltage sampled and held while the charge by the photoelectric conversion elements is stored is applied to the column signal line. Further, this control is featured by performing the reading drive RD (second control) in which the signal voltage that has been sampled and held is applied to the signal line after the internal scanning IS.

According to the first embodiment, a case where the frame capturing rate is 15 fps will be described as an example.

Since the frame rate is 15 fps, a period of capturing the moving image is about 66 msec. The image is read in about 20 msec as described with reference to FIG. 4. Both periods for the sampling drive S1 and the reset drive R1 are about 1 msec, and the period of the X-ray window is 50 msec. As the pixel circuit of the rectangular semiconductor substrate 106, a pixel circuit that can perform non-destructive reading illustrated in FIG. 2 is used.

In FIG. 6, regarding the timing of the signals for controlling the EN, TS, PRES, PCL, and TN signals of the rectangular semiconductor substrate, the reset drive R1 corresponds to the sampling drive S1 illustrated in FIG. 4, and the sampling drive S1 corresponds to the sampling drive S1 illustrated in FIG. 4.

In the time chart illustrated in FIG. 6, command communication is performed at t100 via the interface 110 between the information processing device 101 and the imaging control unit 109 to set the imaging mode. From the time Right after the imaging mode is set at t101, to t106, processing to stabilize the unstable potential of signal lines is performed. In the processing, the signal voltage is applied to the column signal lines and the analog output signal lines that are in a floating state in order to change unstable potential to initial potential.

First, the reset drive R1 is performed from t101 to t102. After the reset drive R1 is finished, the sampling drive S1 is performed from t103 to t104 without waiting for the storage in the PD. At a time point t104 when the sampling drive S1 is finished, the reference voltage VCL is sampled and held in the light signal hold capacitor CS and the noise signal hold capacitor CN of the pixel circuit illustrated in FIG. 2.

The internal scanning IS of the reading circuit in a period from t105 to t106 performs line potential initializing scanning in the reading circuit. This internal scanning IS is a process for applying to the column signal line and the analog output signal line the voltage that is sampled and held while the charge is being stored in the floating diffusion capacitor Cfd.

Figure 7:
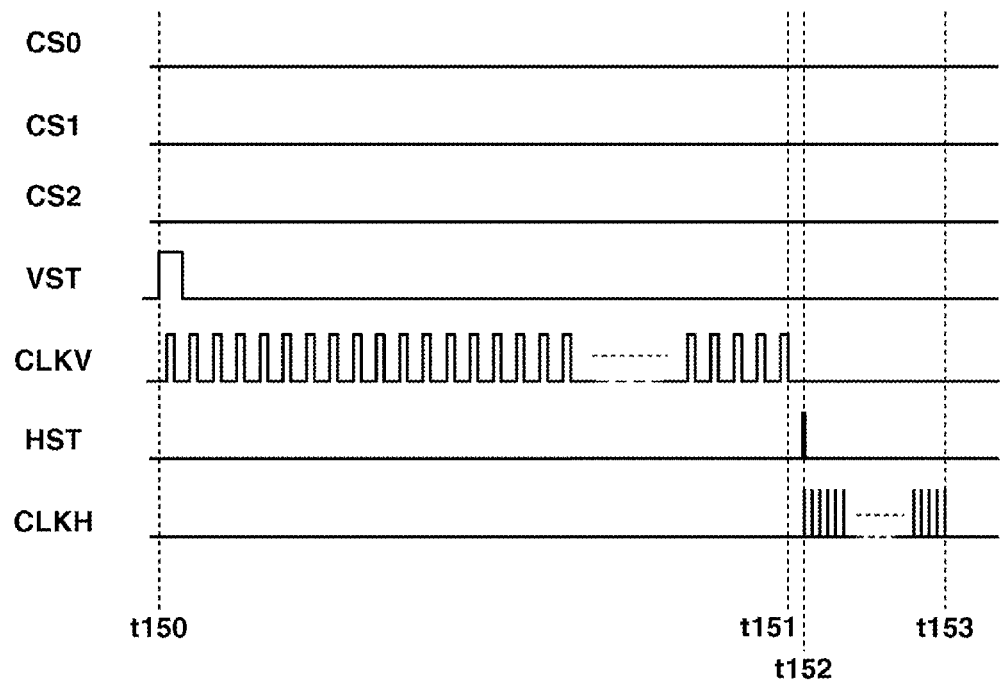
FIG. 7 is a time chart of an initial potential applying operation by internal scanning of a reading circuit.

FIG. 7 is a time chart of the initial potential applying operation that is the internal scanning IS of the reading circuit.

In the internal scanning IS (first control), by turning on the reading switches M9, M12 and the output switch in order, the sampled and held voltage is applied to the column signal line and the analog output signal line. Further, the light signal voltage stored in the capacitor CS and the noise signal voltage stored in the capacitor CN are each applied to the signal lines.

In order to convert the unstable potential into the logic potential and initialize the sample hold potential, only the internal scanning IS of reading the rectangular semiconductor substrate may be performed, and the voltage signal of the internal pixels does not need to be output to the A/D converter.

Further, the row selecting line 305, the column signal lines 306, 307, the analog output signal lines 308, 309 of the reading circuit by the XY address scanning may be controlled to be set to the initial potential. Therefore, according to the present embodiment in which each rectangular semiconductor substrate control signal lines EN, TS, PRES, PCL, TN, VST, CLKV, HST, CLKH are driven by the common drive circuit, the reading circuit may perform substantially one scanning in the vertical direction and at least one scanning in the horizontal direction.

All of the HST, CLKH, VST, and CLKV of the rectangular semiconductor substrate illustrated in FIG. 3 are synchronized with one another to operate, and all chips of the internal circuit are commonly used for operation. Thus, the scanning for reading to initialize the potential may be performed for one piece of the rectangular semiconductor substrate.

The initial potential applying operation is scanning within the reading circuit and does not read the pixels, and thus, the chip selection signals CS0, CS1, CS2 do not perform output to the A/D converter as long as they indicate "Disable". At t150 illustrated in FIG. 7, after setting the vertical scanning start signal VST to high, the vertical scanning clocks CLKV are continuously input, and then the row selecting line 305 inside the reading circuit is sequentially initialized to the logic potential.

Along with the sequential potential initialization of the row selecting line 305, the potential initialization is performed on the column signal lines 306, 307 to set to the reference voltage VCL. The scanning in the horizontal direction is not performed until the CLKV finishes the operation in the vertical direction at t151. Since the scanning in the horizontal direction is not performed, the scanning in the vertical direction is performed at higher speed accordingly. In FIG. 7, the clock period of the vertical scanning clock CLKV is 1 μ sec, and thus the scanning in the vertical direction finishes in 896 μ sec.

The horizontal scanning is performed from t152 after the vertical scanning is completed. The potential initialization is performed on the analog output signal lines 308, 309 to set to the reference voltage VCL. The horizontal scanning is performed at a pixel clock 20 MHz, and thus 128 pixels are completed in about 6.4 μ sec. As described above, the potential initialization by the scanning in the reading circuit is completed in about 0.9 msec.

By performing the reset drive R1, the sampling drive S1, and the internal scanning IS, a drive sequence corresponding to one-frame capturing is performed. This sequence is equivalent to reading and discarding one frame, and thus about 72 msec acquired by adding up 1 msec of the reset drive, 1 msec of the sampling driving, 50 msec of the storage time, and 20 msec of the reading time for normal imaging can be reduced to about 3 msec.

By performing the drive of about 3 msec from t101 to t106, potential initialization can be performed on the unstable potential in the reading circuit, thereby solving a problem in which unstable offset of the initial frame prevents favorable offset correction. Since the internal scanning IS does not amplify the signal voltage with the amplifier 107, perform A/D conversion with the A/D converter 108, and create the image with the imaging control unit 109, the processing time and the processing work can be reduced, and consumption power can be reduced in comparison with a case where the reading drive RD is performed.

The internal scanning IS can be performed anytime when the reading drive RC is not performed. If the internal scanning IS is performed when the charge is being stored in the PD or the capacitor Cfd corresponding to the received light, the efficient drive can be performed by utilizing a merit in which the pixel includes the sample hold circuit and the non-destructive reading can be performed.

The image based on the voltage applied to the signal line by the internal scanning IS (first control) is not created, nor is the A/D conversion performed. Naturally, based on the signal voltage obtained by the sampling drive S1 and the reading drive RD (second control), an object image is created by the imaging control unit 109.

Returning to FIG. 6, control after the potential initialization will be described.

After the potential initialization in the reading circuit is completed at t106, the READY signal 112 output from the imaging control unit 109 to the information processing device 101 becomes an "Enable" state. When the READY signal 112 is in the "Enable" state and the X-ray exposure switch (not illustrated) is turned on, the information processing device 101 outputs to the external synchronization signal line 113 a synchronization pulse having a period of about 66 msec, which is appropriate to the set frame capturing rate.

A condition for outputting the external synchronization signal pulse is that the radioactive imaging device 100 is in a READY state in which the imaging can be performed. Upon detecting the rising of the external synchronization pulse signal in the READY state at 106, the imaging control unit 109 performs the reset drive R1 for starting storage by the sensors.

When the reset drive R1 is completed at t108, the exposure permission signal 114 from the imaging control unit 109 to the information processing device 101 is set to "Enable". Upon confirming that the exposure permission signal 114 has become "Enable", the information processing device 101 outputs the exposure signal to an X-ray generation device, and then a pulse X ray is radiated within a period when the X-ray window is open.

The imaging control unit 109 starts the sampling drive S1 at t109 so that the storage time is 50 msec, which is set. When the X-ray window is closed, at the same time the exposure permission signal 114 is set to "Disable". At t110, the sampling drive S1 is finished and then, the READY signal 112 is set to "Enable" to wait for the rising of the external synchronization signal for preparation of the next frame capturing. At the reading drive RD1 afterward, the imaging control unit 109 performs control to apply the signal voltage that has been sampled and held to the signal line.

Reading of the captured image indicated with the RD1 and RD2 illustrated in FIG. 6 is performed in sequence illustrated with the time chart in FIG. 5, and reading one frame takes about 20 msec. The A/D converter 108 A/D converts the read signal voltage value, and then the imaging control unit 109 creates the captured image data. The image data is transferred from the imaging control unit 109 to the information processing device 101 via an image data interface 111.

Further, the same drive as that of reading the image is performed to create a dark current image without receiving the light in the flat panel sensor 105. The dark current image is used to correct the dark current of the image. More specifically, without receiving the light in the PD, based on the signal voltage obtained by performing the substantially same reading drive as that of the reading drive RD of the image, the dark current image can be created.

In FIG. 6, during periods of the image reading RD1 and RD2, the reset drive R1 is performed. However, since the non-destructive reading is performed, the data while being read is not destructed.

The processing for applying the signal voltage to the row signal line and the column signal line that are in the floating state in the XY address scanning circuit in the reading circuit to initialize the unstable potential is not performed only before the moving image is captured after the imaging mode has been set. The processing described above may be also performed before the first moving image is captured after the power of the image sensor has been turned on, before the moving image is captured after the mode has been switched, and after a time has passed since the previous imaging has been performed.

As described above, by applying the voltage corresponding to the reference voltage of the clamp circuit to the column signal line and the output signal line before the imaging is started, the unstable potential of the signal lines can be stabilized. Therefore, unstable noise elements superimposed on the light signal voltage or the noise voltage can be reduced.

A second embodiment will be described herebelow. The potential initializing processing is performed once on the reading circuit according to the first embodiment, however, it may also be performed a plurality of times.

Further, in the second embodiment, an image sensor includes the pixel addition circuit.

Figure 8A:
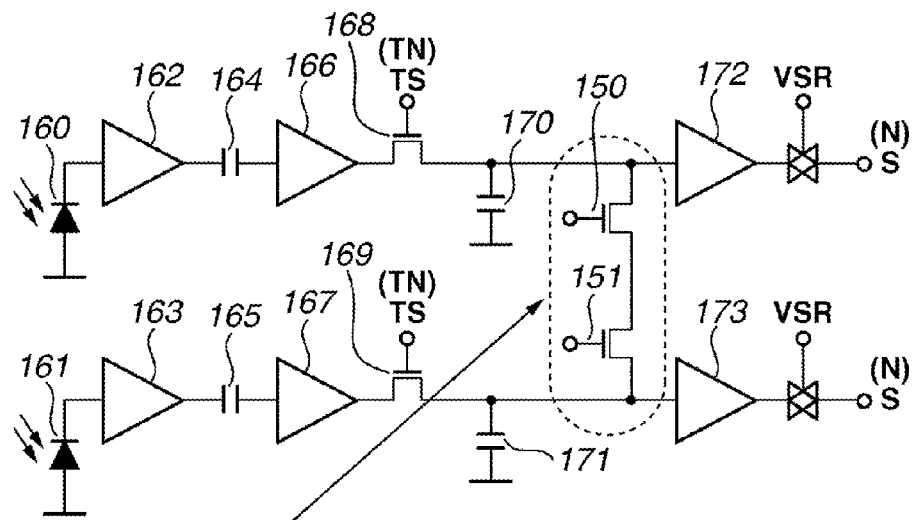
FIG. 8A is a circuit diagram of a pixel addition circuit in an image sensor of a CMOS type.
Figure 8B:
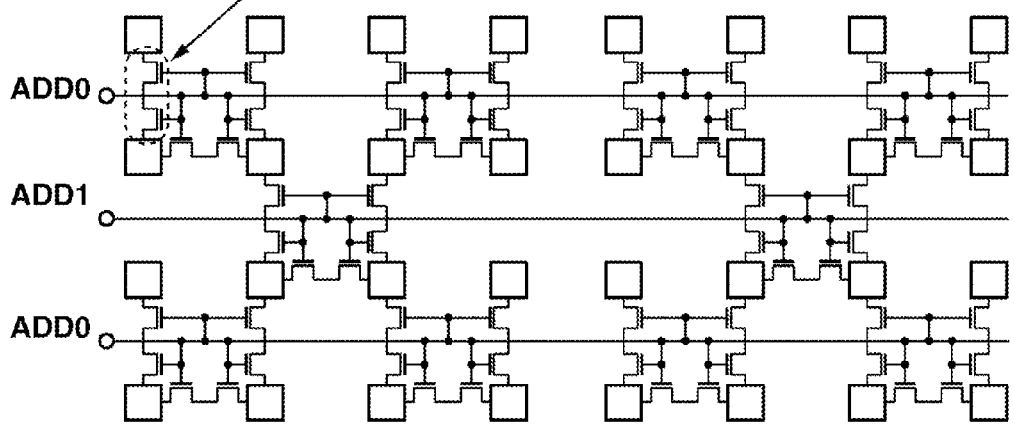
FIG. 8B illustrates a schematic configuration thereof.

FIGS. 8A and 8B are a circuit diagram of the pixel addition circuit in the rectangular semiconductor substrate of a CMOS type and a schematic diagram thereof respectively. FIG. 8A is an example of a circuit including the pixel circuit illustrated in FIG. 1 in simplified two circuits, and the pixel addition circuit additionally. The actual circuit includes the pixel addition circuit for each of "S" and "N" signals, however, in FIG. 8, for the sake of simple descriptions, only one sample hold circuit for either one of the "S" signal or the "N" signal is illustrated.

PDs 160, 161 in the circuits each correspond to the PD illustrated in FIG. 2. Amplification MOS transistors (pixel amplifiers) 162, 163, 166, 167, 172, 173 operate as a source follower of each circuit. The amplification MOS transistors 162, 163 correspond to the pixel amplifier 1 (M4) illustrated in FIG. 1, the amplification MOS transistors 166, 167 correspond to the pixel amplifier 2 (M7), and the amplification MOS transistors 172, 173 correspond to the pixel amplifier "S" (M10) or the pixel amplifier "N" (M13) illustrated in FIG. 2.

Clamp capacitors 164, 165 of the circuits correspond each to the clamp circuit Ccl illustrated in FIG. 2. Sample MOS transistors (sample switch) 168, 169 are included in the sample hold circuit for storing the light signal or the noise signal of each circuit. The sample MOS transistors 168, 169 correspond to the sample hold switch "S" (M8) or the sample hold switch "N" (M11) illustrated in FIG. 2. A light signal hold capacitor or a noise signal hold capacitor 170, 171 correspond to the light signal hold capacitor CS or the noise signal hold capacitor CN illustrated in FIG. 2.

Addition MOS transistors (binning switch) 150, 151 are included in the pixel addition circuit. FIG. 8B illustrates the pixel addition circuit in which the pixel circuit for one pixel of the rectangular semiconductor substrate is represented as "□". A portion enclosed with a dotted line illustrated in FIG. 8A and a portion enclosed with a dotted line illustrated in FIG. 8B indicate the same portion of the circuit. As illustrated in FIG. 8B, the portion enclosed with the dotted line conducts the light signal hold capacitor or the noise signal hold capacitor for pixels adjacent each other and adds up the pixels.

With this arrangement, the pixels to be scanned can be reduced without discarding pixel information, and thus the signals can be read at high-speed frame rate. In FIG. 8B, when an ADD0 signal is set to the high level, an ADD1 signal is set to the low level, pixel addition of 2×2 is performed. When the ADD0 signal is set to the high level, the ADD1 signal is set to the high level, the pixel addition of 4×4 is performed.

In the image sensor of the CMOS type, even in a period when the light for imaging is not irradiated, the dark current is generated. Therefore, the image sensor of the CMOS type has an offset value for the output after the storage, and thus, even the light is not shed, each pixel outputs the value except for "0" as the light signal. The light signal data is obtained without shedding the light during a certain storage period as an offset pattern of the image sensor of the CMOS type. There is a method for correcting offset by subtracting the previously obtained offset pattern during the certain storage period described above from the light signal data obtained when the moving image is obtained during the certain storage period.

FIG. 9 is a timing chart illustrating drive control of the sensor when the moving image is captured in which the X-ray window is limited at the fixed frame rate in the external synchronization mode according to the second embodiment of the present technique. The imaging mode performs the pixel addition of 4×4 and is an example of the high dynamic range mode.

FIG. 9 illustrates an example in which the potential initializing processing is performed on the reading circuit three times at t111, t112, and t113. In the potential initializing processing sequence, while the reset drive R1 is being performed, and while the sampling drive S1 is being performed, the ADD0 signal and the ADD1 signal are set to the low level, and the switching transistor for adding the pixels remains off.

During the period of the internal scanning IS, the ADD0 signal and the ADD1 signal are both set to the high level, the switching transistor for adding the pixels is turned on, and then the internal scanning IS is performed in the pixel addition mode of 4×4. After the internal scanning IS is finished, both of the ADD0 signal and the ADD1 signal are set to the low level, and the switching transistor for adding the pixels is turned off. As described above, when binning reading is performed during the reading drive RD (second control), the imaging control unit 109 applies to the signal line the voltage that has been sampled and held with the binning switch on during the internal scanning IS (first control) prior to the reading drive RD (second control).

According to the second embodiment, similarly to the first embodiment, a case will be described in which the frame capturing rate is 15 fps as an example.

The frame rate is 15 fps, and thus the period of capturing the moving image is about 66 msec. Since, for the reading scanning in the pixel addition mode of 4×4, the vertical scanning circuit performs scanning every four lines, a quarter of scanning lines are read. Accordingly, the reading time is about 5 msec, which is reduced to about a quarter.

The periods of the sampling drive S1 and the reset drive R1 are defined to be about 1 msec, and the period of the X-ray window is defined to be 50 msec. As the pixel circuit of the rectangular semiconductor substrate 106, a pixel circuit that can perform non-destructive reading illustrated in FIG. 2 is used.

In FIG. 9, at t114, the moving image is started to be captured in synchronization with the rising of the external period signal pulse.

The captured image is read in the period of the reading RD. During the reading, the switching transistor for adding the pixels is turned on to perform the internal scanning IS in the pixel addition mode of 4×4. Further, during the sampling drive period for the imaging, both of the ADD0 signal and the ADD1 signal are set to the low level, and the switching transistor for adding the pixels is turned off.

According to the second embodiment, before the X-ray window is opened, reading the stored images is completed.

In the signal pattern of the sampling drive S2 illustrated in FIG. 9, along with resetting of the PD, the PCL signal becomes high and the reference voltage VCL is applied to the clamp circuit. While the PCL signal stays high, the ST signal and the TN signal sample and hold the reference voltage VCL in the light signal hold capacitor CS and the noise signal hold capacitor CN.

According to the first embodiment, the reset drive R1 in which the window is opened is performed using a signal pattern of the reset drive R1 illustrated in FIG. 6. According to the second embodiment, the signal pattern of the sampling drive S2 is used. Since, in the time chart illustrated in FIG. 9, the reading has been completed, the potential of the light signal hold capacitor CS and the noise signal hold capacitor CN may be the reference voltage VCL.

The drive for opening the window can be automatically switched between the reset drive R1 and the sampling drive S2 depending on whether the reading has been finished, when the window is opened.

According to the second embodiment, the potential initializing processing is performed three times, however, it is not limited to three times. The potential initialization may be performed more than three times, or continuously performed until capturing the moving image is started. Thus, by performing the potential initialization a plurality of times, in comparison with performing it once, the adverse effects of the unstable potential of the signal line can be further reduced.

Further, by performing the internal scanning IS with the binning switch on, the unstable potential of the signal line used only at the time of binning, for example the signal line between the binning switches, can be stabilized. In addition to performing the potential initializing processing before the moving image is captured after the imaging mode is set, the potential initializing processing may also be performed before the first moving image is captured after the power of the image sensor has been turned on, before the moving image is captured after the mode has been switched, and after a time has passed since the previous imaging has been performed.

Figure 10:
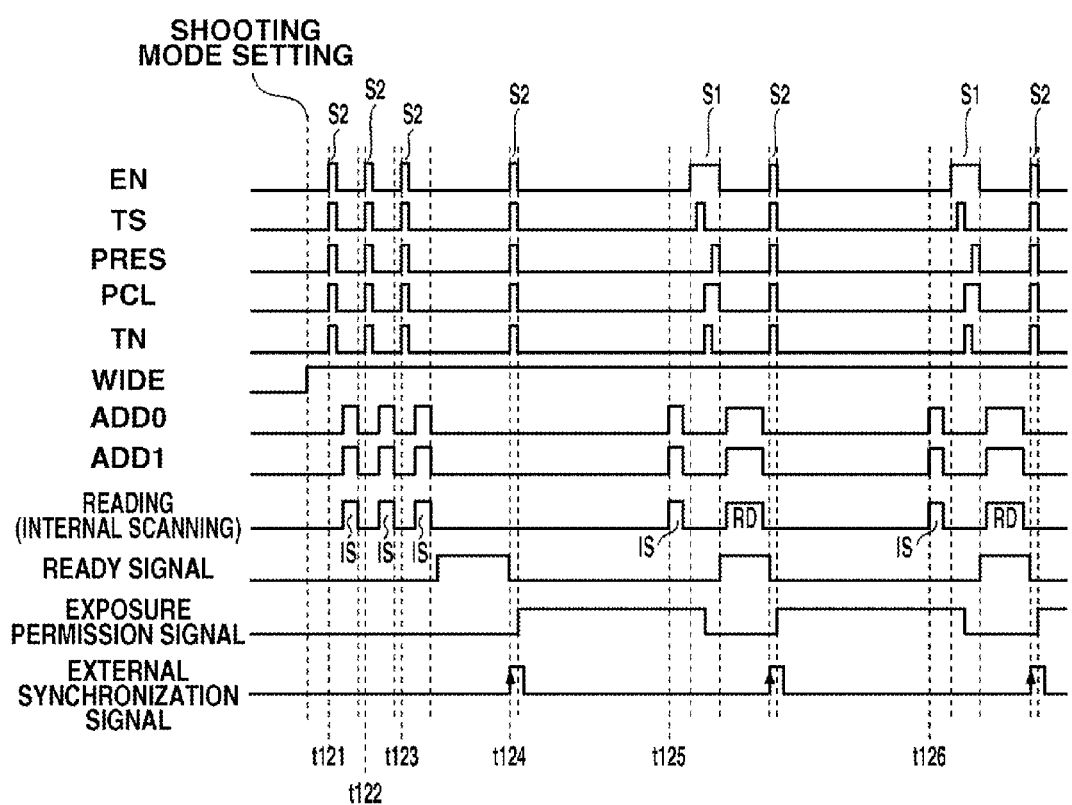
FIG. 10 is a time chart illustrating an example in which sampling drive patterns of sampling drive S2 are used for potential initializing processing of a reading circuit.

A third embodiment will be described herebelow. FIG. 10 illustrates an example in which the sampling drive pattern of the sampling drive S2 is used for potential initializing processing of the reading circuit. Since the sampling drive S2 also serves as the sampling drive S1, the sampling drive S1 of the potential initializing processing of the reading circuit performed in FIG. 9 can be omitted. After the reading drive RD (second control) is performed, the internal scanning IS (first control) for applying the sampled and held signal voltage to the signal line is performed.

FIG. 10 illustrates an example in which the potential initializing processing is performed on the reading circuit three times at t121, t122, and t123. At each of t121, t122, and t123, the sampling drive S2 is started, and after the sampling drive S2 is finished, the internal scanning IS is performed on the reading circuit to initialize the unstable potential therein to the reference potential VCL that is the logic potential and the sample hold potential.

According to the third embodiment, making a good use of a feature of the non-destructive reading sensor, the internal scanning IS (first control) is performed while the exposure permission signal is being output to the radiation generation apparatus 103. More specifically, the internal scanning IS is performed on the reading circuit at t125, t126 during the storage period when the X-ray window is open. The internal scanning IS of the reading circuit has been completed before the sampling drives S1 is started.

According to the third embodiment, the reset drive when the X-ray window is opened uses the signal pattern of the sampling drive S2. By the internal scanning IS at t125, t126, the unstable potential in the reading circuit is initialized to the reference potential VCL that is the logic potential and the sample hold potential. By performing the internal scanning IS right before the reading scanning, the potential in the reading circuit becomes stable and the offset correction can be favorably performed.

As described above, according to the present embodiment, by performing the sampling drive S2 before the reading drive RD for reading the charge from the pixel is performed, the first sample hold circuit for holding the light signal holds the reference voltage of the clamp circuit, and then can hold the light signal. With this arrangement, the noise caused by the sample hold circuit can be removed.

The internal scanning IS performed on the reading circuit at t125, t126 during the storage period when the X-ray window is open is particularly effective when the moving image is captured at the low frame rate.

Figure 11:
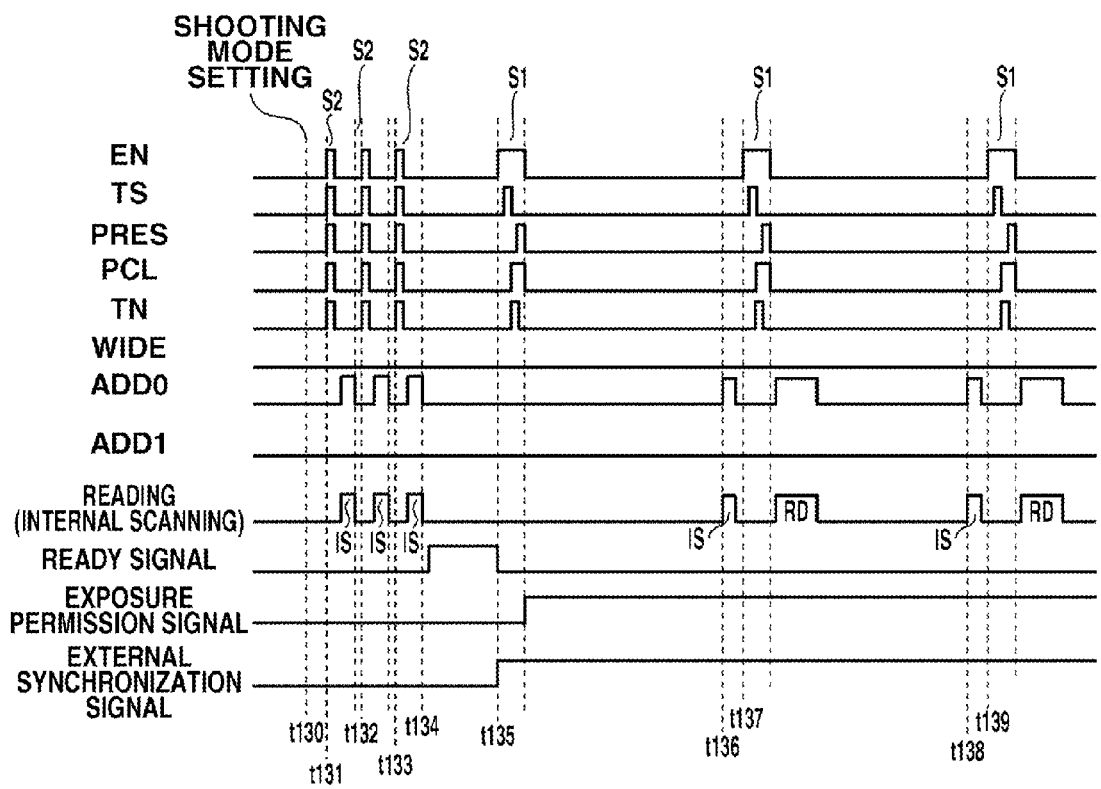
FIG. 11 is a timing chart illustrating drive control in a continuous X-ray fluoroscopic mode.

FIG. 11 is a timing chart illustrating the drive control in a continuous X-ray fluoroscopic mode according to a fourth embodiment of the present technique. In order to use the continuous X-ray, the x-ray window is fully open. The imaging mode according to the fourth embodiment performs the pixel addition of 2×2 and is an example of a high sensitivity mode.

At t131, t132, and t133, the sampling drive S2 is started. After the sampling drive S2 is finished, the internal scanning IS is performed on the reading circuit. With this arrangement, the unstable potential in the reading circuit is initialized to the reference potential VCL that is the logic potential and the sample hold potential.

After the potential initialization of the reading circuit has been completed at t134, the READY signal 112 output from the imaging control unit 109 to the information processing device 101 becomes the "Enable" state. When the X-ray fluoroscopic switch (not illustrated) is turned on while the READY signal 112 is in the "Enable" state in the information processing device 101, the external synchronization signal becomes "Enable".

When the external synchronization signal detects "Enable", the imaging control unit 109 sets the READY signal to "Disable", and then performs the sampling drive S1 including the reset drive. Upon completing the sampling drive S1, the imaging control unit 109 sets the exposure permission signal to "Enable", and repeatedly performs the sampling drive S1 by the internal synchronization pulse signal (not illustrated) output with a period of the set frame rate. The information processing device 101 detects "Enable" of the exposure permission signal, gives an instruction for irradiation with the continuous X-ray to the X-ray generation device, and then the irradiation of the continuous X-ray is started.

Right after the sampling drive S1 after the X-ray image is stored, the reading operation RD is periodically performed to perform the fluoroscopic imaging. Similarly to the third embodiment, right before the sampling drive S1, the internal scanning IS is started on the reading circuit and is completed before the sampling drive S1 is started.

It is the sampling drive S1 that is started to be driven before the internal scanning IS at t138. Therefore the output of the photoelectric conversion element is sampled in the light signal hold capacitor CS. By the internal scanning IS, the unstable potential of the light signal transmission path in the reading circuit is initialized to the voltage within an output range of the pixel circuit. Since the potential of the light signal transmission path is set to the voltage within the output range of the pixel circuit, similarly to other embodiments, the offset can be stabilized.

Typically, the light signal voltage is applied to the light signal line by the reading drive RD and the reference voltage is applied to the noise signal line. Therefore, when the moving image imaging is driven, the noise caused by the signal line is not superimposed on a second frame or later. However, when capturing an image at the low frame rate, a time interval from the reading drive RD to the following reading drive RD may be long.

Particularly, when the image sensor has the characteristics of being greatly affected by a noise caused by the signal line, the noise that cannot be ignored can be stored on the signal line with that time interval described above. Thus, by performing the internal scanning IS right before the sampling drive S1, the noise of the signal line generated during the storage time can be removed.

In the present embodiment, when the imaging apparatus includes the sample hold circuit in the pixel circuit and can perform the non-destructive reading, the internal scanning IS can be performed within the storage time. Accordingly, without changing the sampling drive S1 and the reading drive RD, the control of the internal scanning IS can be added.

Figure 12:
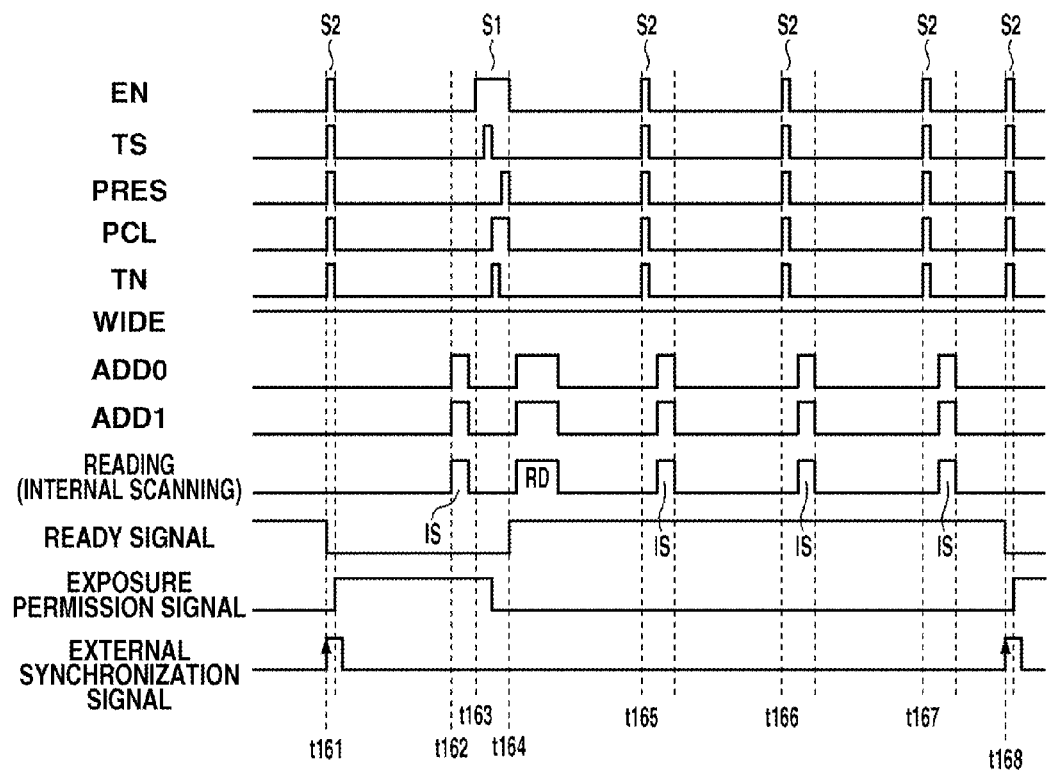
FIG. 12 is a timing chart illustrating another example of drive control in an external synchronization imaging mode.

FIG. 12 is a timing chart illustrating the drive control in the external synchronization imaging mode according to a fifth embodiment of the present technique. The imaging mode performs the pixel addition of 4×4 and is an example of a high dynamic range mode.

According to the present embodiment, the imaging control unit 109 samples and holds the signal voltage, and then performs the internal scanning IS (first control) for applying the signal voltage to the column signal line. Subsequently, the imaging control unit 109 performs the reading drive RD (second control) for applying the signal voltage to the column signal line. More specifically, after the internal scanning IS for applying to the signal line the signal voltage to be read is performed, reading of the signal voltage is controlled.

Further, when the reading drive RD (second control) is not performed for a predetermined time after the reading drive (second control) has been finished, the imaging control unit 109 performs internal scanning IS (first control).

FIG. 12 illustrates the drive when the imaging in the above-described mode is suspended at t164, and then resumed at t168. FIG. 12 illustrates an example in which, after reading the captured image has been finished at t164, with a period equal to or less than an interval for capturing the moving image frame, the potential initializing drive for the unstable potential in the reading circuit is added at t165, t166, and t167.

For example, when the frame capturing rate is 15 fps, the frame capturing period is 66 msec. Thus, the period of the potential initializing drive of the unstable potential is 66 msec or less to prevent the floating portion from having the unstable potential.

At t165, t166, and t167, the sampling drive S2 is started. After the sampling drive S2 is finished, the internal scanning IS is performed on the reading circuit, and then the unstable potential in the reading circuit is initialized to the reference voltage VCL that is the logic potential and the sample hold potential.

The potential initializing drive for the unstable potential in the reading circuit is not performed while the reading processing is being performed on the image. Further, during the sampling drive S2 while the potential initializing drive is being performed on the unstable potential and during the internal scanning IS on the reading circuit, if the external synchronization signal is input, the potential initializing drive on the unstable potential is stopped. Subsequently, for example, the imaging drive that is started at the sampling drive S2 at t168 may be started.

As described above, the signal voltage to be read is applied to the signal line and then controlled to be read so that the impact of the unstable potential in the signal line can be further reduced.

Figure 13:
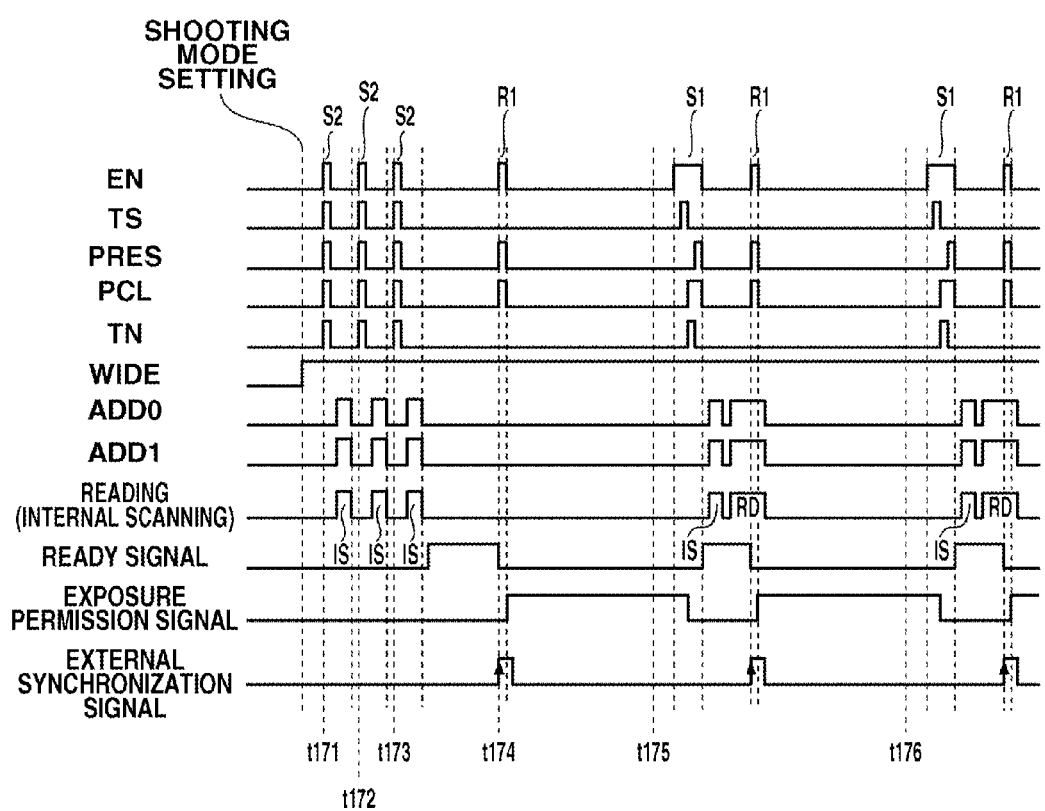
FIG. 13 is a timing chart illustrating another example of drive control in an external synchronization imaging mode.

FIG. 13 is a timing chart illustrating the drive control in the external synchronization imaging mode according to a sixth embodiment of the present technique. The imaging mode performs the pixel addition of 4×4 and is an example of the high dynamic range mode. The configuration and processing same as those of the first embodiment will not be repeated.

In the sixth embodiment, before reading the stored image, the internal scanning IS is performed to fix the unstable potential of the floating portion in the reading circuit, particularly the transmission line of the image data to the voltage of the image data that is to be actually read. After the internal scanning IS, the normal image reading is performed.

Since the noise caused by the capacity of the signal line tends to increase with the lapse of time, the noise superimposed on the signal line can be always reduced to less than a certain level. Further, before the signal voltage is applied to the signal line, the internal scanning IS is performed with the voltage same as the signal voltage. Therefore, the noise caused by change of the voltage applied to the signal line can be reduced.

Figure 14:
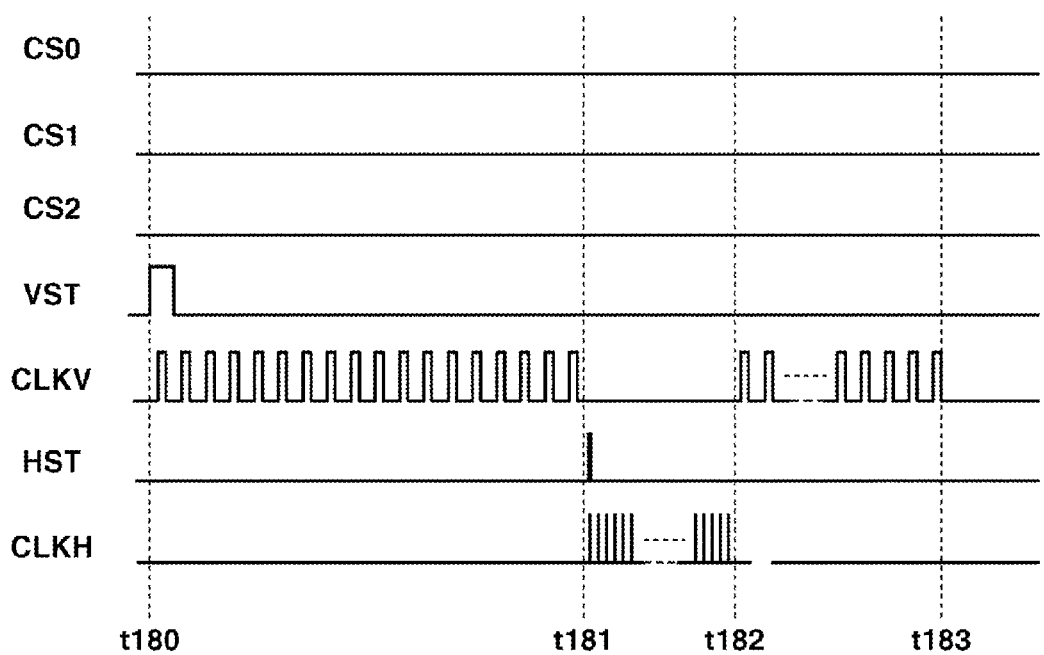
FIG. 14 is a time chart illustrating an example in which horizontal scanning of an initial potential applying operation by internal scanning of a reading circuit is performed while vertical scanning is being performed.

FIG. 14 is a time chart illustrating an example in which the horizontal scanning of the initial potential applying operation by the internal scanning in the reading circuit is performed while the vertical scanning is being performed. According to a seventh embodiment of the present technique, for the internal scanning IS (first control), after at least one reading switch M9 (M12) is turned on, all output switches are turned on in order, and then subsequently another reading switch M9 (M12) is turned on. As illustrated in FIG. 14, the scanning in the horizontal direction is performed in the middle of an arbitrary line. The configuration and processing same as those of the first embodiment will not be repeated.

Typically, the feature of the pixel included in the column at an end portion of the rectangular semiconductor substrate can be different from another pixel. As illustrated in FIG. 14, by performing the scanning in the horizontal direction while the scanning in the arbitrary vertical direction is being performed, the noise can be prevented that is generated by applying the signal from the pixel having a non-preferable feature to the output signal line.

As described above, the imaging control unit 109 first performs the first control for applying the sampled and held electric signal to a plurality of signal lines. Subsequently, the imaging control unit 109 performs the second control for sequentially applying to the signal lines in order the electric signal obtained by a plurality of pixels corresponding to the received light and then performing the reading.

Further, the imaging control unit 109 does not create the image data based on the electric signal applied to the signal line by the first control but creates the image data based on the electric signal read by the second control via the signal line. With this arrangement, the unstable potential of the column signal line can be stabilized in a certain range, at least, in a range of values of the sampled and held electric signal. Therefore, the noise superimposed on the electric signal can be reduced to improve the image quality.

The first control, in other words, the internal scanning IS, is the processing for applying to each signal line the electric signal output from at least one of the plurality of pixels connected to each signal line. Therefore, the electric signal output from the pixel by the first control is not amplified by the amplifier nor A/D converted unlike the second control. Accordingly, the processing time is shorter than that of the normal reading RD (second control) of the pixel signal, thereby contributing to improving the frame rate.

When the internal scanning IS is performed, the imaging control unit 109 turns off the chip selection signal CS and a transmission switch. Thus, the image sensor and the A/D converter are not brought into conduction. It may be set that, even without turning off the transfer switch, the amplifying processing or the A/D converting processing is not performed or the amplifier or the A/D converter does not output the signal.

Herein, by performing control to apply to the signal line the electric signal corresponding to the sampled and held clamp potential according to the present embodiment, the unstable potential of the signal line can be further stabilized.

The imaging control unit 109 can perform the first control before the imaging to stabilize the unstable potential of the signal line in the floating state entered before the imaging. Further, in response to finish of the first control, the signal indicating that preparation for the imaging has been finished is output. In response to the signal, control is performed to start irradiating with the X-ray in order to reduce the frame rate and improve the image quality.

By repeatedly performing the first control, the effects of stabilization of the unstable potential can be improved. Further, in capturing the moving image, while the photoelectric conversion element is receiving the light to store the charge or while the exposure permission signal is output to the radiation generation device, the internal scanning IS is performed, so that the adverse effects of the unstable potential can be further reduced.

When the internal scanning IS is performed during the imaging, by applying the non-destructive light signal that has been sampled and held, to the signal line, the potential of the signal line can be set closer to that of the light signal to improve the effects of reducing the noise. When the light signal of the previous frame is left as sampled and held while the current frame is receiving the light, by performing the internal scanning IS with the signal of the previous frame, the control can be simplified. Particularly, with this control, even when imaging is performed with continuous X-rays instead of pulse X-ray, the unstable potential can be reduced.

When the low frame rate is used, the floating time may be extended to increase the adverse effects of the unstable potential. However, when the reading drive RD is not performed, the internal scanning IS is performed with a predetermined interval to reduce the adverse effects.

The internal scanning IS is performed by sequentially connecting the pixels to the column signal lines, and then sequentially connecting the column signal lines to the output lines. In the middle of sequentially connecting the pixels to the column signal lines, the column signal lines and the output lines can be sequentially connected so that the voltage applied to the signal line having a preferable characteristic can be applied to the output line. Therefore, the effects for stabilizing the potential can be further improved.

When the sample hold circuits of two systems for the light signal and the FPN are included, by performing the above-described internal scanning processing on each of the sample hold circuits, the signal difference between the light signal and the FPN can be minimized to appropriately reduce FPN noise.

When an analog binning circuit is mounted in the sensor, by performing the internal scanning IS with the binning switch turned on, the unstable potential caused by the binning circuit can be stabilized.

Other Embodiments

The embodiments described above are merely examples, and other various embodiments can be provided. In addition, the processing performed by each block illustrated in FIG. 1 may be performed by a plurality of divided circuit blocks, or a plurality of blocks may be mounted as one circuit. Further, the function of the imaging apparatus may be divided into a plurality of devices and performed. Furthermore, the function of the radiation imaging system may be realized by one device such as a mobile C arm device.

In the description of each embodiment of the present technique described above, the radiation imaging apparatus technique is described that adopts the X-ray imaging device that captures the X-ray image data of the object using the X-ray, which is one kind of the radiation. Further, in addition to the X-ray imaging device, for example, other radiation (e.g., α ray, β ray, and γ ray) can be used to apply the present technique to the radiation imaging apparatus that captures the radiation image of the object.

Furthermore, the present technique may be applied to the imaging apparatus such as fundus cameras that receive visible light and narrow band light to capture an image. In that case, dose values described above are replaced with a light amount or light intensity.

However, a large plain sensor such as the flat panel detector (FPD) of the X-ray photographing system tends to have large adverse effects on the image quality due to the unstable potential greatly caused by the capacitance of the signal line. Further, from a point of view of reducing a radiated dose, imaging with low-dose radiation is desired. When the low-dose radiation is used, the noise is more obvious. Therefore, by using the present technique for the X-ray photographing apparatus or the control device of the X-ray sensor, the image quality can be improved to obtain the useful images for diagnosis.

Other Embodiments

Aspects of the present technique can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to embodiments, it is to be understood that the invention is not limited to the disclosed embodiments. It will of course be understood that this invention has been described above by way of example only, and that modifications of detail can be made within the scope of this invention.

This application claims priority from Japanese Patent Application No. 2010-243808 filed Oct. 29, 2010, which is hereby incorporated by reference herein in its entirety.

What is claimed is:

1. An imaging apparatus comprising:
a plurality of pixel circuits arranged in a matrix, each of the plurality of pixel circuits including, a photoelectric conversion element, a sample hold circuit, an amplifier for amplifying an electric signal held by the sample hold circuit, and a switch for transferring the electrical signal amplified by the amplifier;
a plurality of signal lines configured to read from the plurality of pixel circuits the electrical signal transferred by the switch;
a control unit for performing a first control for transferring electrical signals in accordance with a predetermined potential supplied to the sample hold circuit to the plurality of signal lines, and a second control for sequentially transferring to the plurality of signal lines electrical signals collectively held by a plurality of sample hold circuits of the plurality of pixel circuits from a plurality of photoelectric conversion elements of the plurality of pixel circuits by a plurality of switches of the plurality of pixel circuits corresponding to light received by each of the plurality of photoelectric conversion elements, after the first control has been performed; and
a generation unit configured to create image data based on the electrical signals transferred to the plurality of signal lines by the second control.

2. The imaging apparatus according to claim 1, wherein each of the plurality of pixel circuits further includes a pixel amplifier that is connected between the photoelectric conversion element and the sample hold circuit and configured to obtain an electrical signal corresponding to charge stored in the photoelectric conversion element, the sample hold circuit is configured to hold the electric signal obtained by the pixel amplifier, and
wherein the control unit is configured to perform the first control for transferring electric signals from the plurality of the pixel circuits to the plurality of signal lines while the photoelectric conversion element is storing the charge.

3. The imaging apparatus according to claim 2, wherein the control unit is configured to perform the first control while the photoelectric conversion element is receiving the light, and subsequently to perform the second control.

4. The imaging apparatus according to claim 3, wherein the control unit is configured to perform the first control while an exposure permission signal is being output to a radiation generation device.

5. The imaging apparatus according to claim 1, wherein each of the plurality of pixel circuits further includes a pixel amplifier that is connected between the photoelectric conversion element and the sample hold circuit and configured to obtain an electrical signal corresponding to charge stored in the photoelectric conversion element, and a clamp circuit disposed between the pixel amplifier and the sample hold circuit, and
wherein the control unit performs, as the first control, transferring electrical signals corresponding to a reference voltage applied to the clamp circuit from the plurality of pixel circuits to the plurality of signal lines.

6. The imaging apparatus according to claim 1, further comprising a switch configured to select whether to output the electrical signal obtained by each of the plurality of pixel circuits to an A/D converter,
wherein, when performing the first control, the control unit is configured to control the switch not to output to the A/D converter the electrical signal obtained by each of the plurality of pixel circuits with a selection unit.

7. The imaging apparatus according to claim 1, wherein the control unit is configured to perform, as the first control, internal scanning processing for transferring electrical signals to each of the plurality of signal lines sequentially in order to reduce potential of the plurality of signal lines to a predetermined range and reduce noise superimposed on the electrical signal transferred by the second control.

8. The imaging apparatus according to claim 1,
wherein the control unit is configured to cause an A/D converter to A/D convert the electrical signal; and
wherein the generation unit is configured to create the image data based on the A/D converted data.

9. The imaging apparatus according to claim 1, wherein the control unit is configured to output a signal indicating that preparation for imaging is completed, in response to completion of the first control.

10. The imaging apparatus according to claim 1, wherein the control unit is configured, after repeatedly performing the first control, to perform the second control.

11. The imaging apparatus according to claim 1, wherein the amplifier comprises an amplification transistor that is connected between the sample hold circuit and the reading switch, and wherein the control unit is configured to perform the first control for causing the sample hold circuit to hold the electrical signal obtained by receiving the light using the photoelectric conversion element and for causing the amplification transistor to output an electric signal corresponding to the electric signal held by the sample hold circuit and for causing the reading switch to transfer to a signal line of the plurality of signal lines the electrical signal outputted by the amplification transistor, and to perform the second control after the first control has been performed.

12. The imaging apparatus according to claim 11, wherein the control unit is configured to perform the first control for transferring to the signal line an electrical signal of a previous frame that has been sampled and held in order to hold an electrical signal of a current frame using the sample hold circuit, and subsequently to perform the second control.

13. The imaging apparatus according to claim 1, wherein, when the second control is not performed within a predetermined time after the second control has been finished, the control unit is configured to perform the first control.

14. The imaging apparatus according to claim 1, further comprising an image sensor in which the plurality of pixel circuits is arranged, a plurality of row selecting lines for transmitting the signal for selecting the pixel for each row is arranged in parallel with a row, a plurality of column signal lines for reading the signal of the selected pixel for each column is arranged in parallel with a column, and a plurality of output signal lines for outputting the signal of the column signal lines to an A/D converter is arranged.

15. The imaging apparatus according to claim 14, further comprising:
an output switch configured to control whether to apply to the output signal line the voltage applied to the column signal line,
wherein the control unit is configured to perform the first control so as to sequentially turn on the switch and the output switch to apply the held voltage to the column signal line and the output signal line as the signal line.

16. The imaging apparatus according to claim 15, wherein the control unit is configured to perform the first control, after sequentially turning on at least one switch, so as to sequentially turn on all of the output switches, and then sequentially turn on the rest of the reading switches.

17. The imaging apparatus according to claim 1, further comprising a reset circuit configured to reset the charge stored in the photoelectric conversion element,
wherein the control unit is configured to cause the reset circuit to reset the charge and is configured to set a pixel amplifier to a non-operation state in order to shift the photoelectric conversion element to a state of storing the charge.

18. The imaging apparatus according to claim 1,
wherein the sample hold circuit comprises a first sample hold circuit configured to sample and hold a light electrical signal according to the charge corresponding to an amount of received light and a second sample hold circuit configured to sample and hold a noise electrical signal,
wherein the plurality of signal lines comprises a first signal line according to the first sample hold circuit and a second signal line according to the second sample hold circuit, and
wherein the switch comprises a first switch that is connected between the first sample hold circuit and the first signal line and a second switch that is connected between the second sample hold circuit and the second signal line.

19. The imaging apparatus according to claim 1, wherein the generation unit is configured to create an image based on the electrical signal obtained by performing the second control while receiving the light using the photoelectric conversion element, and a dark current image based on the electrical signal obtained by performing substantially the same control as the second control without receiving the light using the photoelectric conversion element.

20. The imaging apparatus according to claim 1, further comprising a binning switch configured to bring into conduction a plurality of holding units corresponding to a plurality of photoelectric conversion elements,
wherein the control unit is configured, when the binning switch is turned on to perform binning reading in the second control, to perform control for applying the voltage held by the holding unit with the binning switch turned on in the first control prior to the second control.

21. The imaging apparatus according to claim 1, wherein the control unit is configured to perform the first control for transferring electric signals from one column of the plurality of the pixel circuits to a signal line of the plurality of signal lines in order.

22. A radiation imaging system comprising:
the imaging apparatus according to claim 1;
a radiation generation device; and
a display unit configured to display the created image.

23. The imaging apparatus according to claim 1, wherein, as the first control, the control unit is configured to transfer to the plurality of signal lines electrical signals from at least one of the plurality of pixel circuits connected to the plurality of signal lines, and the generation unit is configured to not create image data based on electrical signals transferred to each of the plurality of signal lines by the first control.

24. A control method for imaging that uses an image sensor including a plurality of pixel circuits arranged in a matrix, each of the plurality of pixel circuits including, a photoelectric conversion element, a sample hold circuit, an amplifier for amplifying an electric signal held by the sample hold circuit, and a switch for transferring the electrical signal amplified by the amplifier, and a plurality of signal lines configured to read the electrical signals transferred by the reading switch from the plurality of pixel circuits, the control method comprising:
performing a first control for transferring electrical signals in accordance with a predetermined potential supplied to the sample hold circuit to the plurality of signal lines;
performing a second control for transferring electrical signals collectively held by a plurality of sample hold circuits of the plurality of pixel circuits from a plurality of photoelectric conversion elements of the plurality of pixel circuits by a plurality of switches of the plurality of pixel circuits corresponding to light received by each of the plurality of photoelectric conversion elements, after the first control has been performed; and
creating image data based on the electrical signals transferred to the plurality of signal lines by the second control.

* * * * *